(12) United States Patent
Abrams

(10) Patent No.: US 9,175,436 B2
(45) Date of Patent: Nov. 3, 2015

(54) FLOCKED ARTICLES HAVING A RESISTANCE TO SPLITTING AND METHODS FOR MAKING THE SAME

(75) Inventor: Louis Brown Abrams, Fort Collins, CO (US)

(73) Assignee: High Voltage graphics, Inc., Fort Collins, CO (US)

( * ) Notice: Subject to any disclaimer, the term of this patent is extended or adjusted under 35 U.S.C. 154(b) by 1098 days.

(21) Appl. No.: 13/046,155

(22) Filed: Mar. 11, 2011

(65) Prior Publication Data

US 2011/0223373 A1    Sep. 15, 2011

Related U.S. Application Data

(60) Provisional application No. 61/313,592, filed on Mar. 12, 2010, provisional application No. 61/326,885, filed on Apr. 22, 2010, provisional application No. 61/356,425, filed on Jun. 18, 2010, provisional application No. 61/358,679, filed on Jun. 25, 2010, provisional application No. 61/364,312, filed on Jul.

(Continued)

(51) Int. Cl.
| | | |
|---|---|---|
| *D06N 7/00* | (2006.01) |
| *D06Q 1/14* | (2006.01) |
| *B32B 7/12* | (2006.01) |
| *B32B 5/02* | (2006.01) |
| *B32B 37/12* | (2006.01) |
| *C09J 7/02* | (2006.01) |

(52) U.S. Cl.
CPC ............... *D06N 7/0097* (2013.01); *B32B 7/12* (2013.01); *D06Q 1/14* (2013.01); *B32B 5/024* (2013.01); *B32B 37/12* (2013.01); *B32B 2305/22* (2013.01); *C09J 7/0296* (2013.01); *C09J 2400/263* (2013.01); *Y10T 428/23943* (2015.04)

(58) Field of Classification Search
CPC ......... D06N 7/0097; D06Q 1/14; D06Q 1/12; Y10T 428/23943
USPC ....................................... 428/90, 95
See application file for complete search history.

(56) References Cited

U.S. PATENT DOCUMENTS

| | | | |
|---|---|---|---|
| 1,580,717 | A | 4/1926 | Flick |
| 1,975,542 | A | 10/1934 | Forsdale |
| 2,278,227 | A | 3/1942 | Thackeray et al. |
| 2,592,602 | A | 4/1952 | Saks |
| 2,636,837 | A | 4/1953 | Summers |
| 2,981,588 | A | 4/1961 | Haber |
| 2,999,763 | A | 9/1961 | Sommer |

(Continued)

FOREIGN PATENT DOCUMENTS

| | | |
|---|---|---|
| EP | 0122656 | 10/1984 |
| EP | 0210304 | 2/1987 |

(Continued)

OTHER PUBLICATIONS

"3914 Data Sheet." Bemis, Aug. 20, 2009, 2 pages.

(Continued)

*Primary Examiner* — Cheryl Juska
(74) *Attorney, Agent, or Firm* — Sheridan Ross P.C.

(57) ABSTRACT

A flocked article having a resistance to splitting is described. The article has a flock layer adhered to one side of an elastomeric adhesive layer and an inelastic layer adhered to the other side of the elastomeric adhesive layer. The flock layer is adhered to a stretchable and/or elastic substrate by a third adhesive positioned between and in contact with the inelastic layer and the stretchable and/or elastic substrate.

23 Claims, 20 Drawing Sheets

Related U.S. Application Data 14, 2010, provisional application No. 61/373,738, filed on Aug. 13, 2010, provisional application No. 61/377,790, filed on Aug. 27, 2010, provisional application No. 61/378,751, filed on Aug. 31, 2010, provisional application No. 61/380,892, filed on Sep. 8, 2010, provisional application No. 61/381,360, filed on Sep. 9, 2010, provisional application No. 61/385,760, filed on Sep. 23, 2010, provisional application No. 61/389,544, filed on Oct. 4, 2010, provisional application No. 61/392,837, filed on Oct. 13, 2010, provisional application No. 61/405,558, filed on Oct. 21, 2010, provisional application No. 61/422,979, filed on Dec. 14, 2010, provisional application No. 61/429,623, filed on Jan. 4, 2011.

(56) References Cited

U.S. PATENT DOCUMENTS

| | | |
|---|---|---|
| 3,099,514 A | 7/1963 | Haber |
| 3,215,584 A | 11/1965 | McConnell et al. |
| 3,314,845 A | 4/1967 | Perri |
| 3,377,232 A | 4/1968 | Meacock et al. |
| 3,432,446 A | 3/1969 | Coppeta |
| 3,459,579 A | 8/1969 | Newman |
| 3,496,054 A | 2/1970 | Baigas, Jr. |
| 3,529,986 A | 9/1970 | Kappas et al. |
| 3,565,742 A | 2/1971 | Stephens et al. |
| 3,591,401 A | 7/1971 | Snyder et al. |
| 3,660,200 A | 5/1972 | Anderson et al. |
| 3,674,611 A | 7/1972 | Petry et al. |
| 3,772,132 A | 11/1973 | Dulin, Jr. |
| 3,793,050 A | 2/1974 | Mumpower, Jr. |
| 3,837,946 A | 9/1974 | Gribbin |
| 3,887,737 A | 6/1975 | Baxter et al. |
| 3,903,331 A | 9/1975 | Klein |
| 3,917,883 A | 11/1975 | Jepson |
| 3,956,552 A | 5/1976 | Geary |
| 3,961,116 A | 6/1976 | Klein |
| 3,979,538 A | 9/1976 | Gilman et al. |
| 4,018,956 A | 4/1977 | Casey |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,088,708 A | 5/1978 | Riew |
| 4,142,929 A | 3/1979 | Otomine et al. |
| 4,201,810 A | 5/1980 | Higashiguchi |
| 4,218,501 A | 8/1980 | Kameya et al. |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,314,813 A | 2/1982 | Masaki |
| 4,319,942 A | 3/1982 | Brenner |
| 4,340,632 A | 7/1982 | Wells et al. |
| 4,362,773 A | 12/1982 | Shikinami |
| 4,385,588 A | 5/1983 | Bennetot |
| 4,390,387 A | 6/1983 | Mahn |
| 4,396,662 A | 8/1983 | Higashiguchi |
| 4,413,019 A | 11/1983 | Brenner |
| 4,418,106 A | 11/1983 | Landler et al. |
| 4,430,372 A | 2/1984 | Knoke et al. |
| 4,438,533 A | 3/1984 | Hefele |
| 4,465,723 A | 8/1984 | Knoke et al. |
| 4,574,018 A | 3/1986 | Masuda et al. |
| 4,588,629 A | 5/1986 | Taylor |
| 4,652,478 A | 3/1987 | Maii |
| 4,668,323 A | 5/1987 | Lenards et al. |
| 4,681,791 A | 7/1987 | Shibahashi et al. |
| 4,687,527 A | 8/1987 | Higashiguchi |
| 4,741,791 A | 5/1988 | Howard et al. |
| 4,810,549 A | 3/1989 | Abrams et al. |
| 4,895,748 A | 1/1990 | Squires |
| 4,931,125 A | 6/1990 | Volkmann et al. |
| 4,961,896 A | 10/1990 | Constantino |
| 4,980,216 A | 12/1990 | Römpp |
| 5,008,130 A | 4/1991 | Lenards |
| 5,047,103 A | 9/1991 | Abrams et al. |
| 5,059,452 A | 10/1991 | Squires |
| 5,126,182 A | 6/1992 | Lumb et al. |
| 5,207,851 A | 5/1993 | Abrams |
| 5,346,746 A | 9/1994 | Abrams |
| 5,529,650 A | 6/1996 | Bowers et al. |
| 5,534,099 A | 7/1996 | Yamamoto |
| 5,543,195 A | 8/1996 | Squires et al. |
| 5,597,633 A | 1/1997 | Mecke et al. |
| 5,597,637 A | 1/1997 | Abrams et al. |
| 5,658,630 A | 8/1997 | Shizukuda et al. |
| 5,685,223 A | 11/1997 | Vermuelen et al. |
| 5,756,180 A | 5/1998 | Squires et al. |
| 5,766,397 A | 6/1998 | Jones |
| 5,804,007 A | 9/1998 | Asano |
| 5,858,156 A | 1/1999 | Abrams et al. |
| 5,863,633 A | 1/1999 | Squires et al. |
| 5,981,021 A | 11/1999 | McCulloch |
| 6,010,764 A | 1/2000 | Abrams |
| 6,083,332 A | 7/2000 | Abrams |
| 6,110,560 A | 8/2000 | Abrams |
| 6,224,707 B1 | 5/2001 | Lion |
| 6,247,215 B1 | 6/2001 | Van Alboom et al. |
| 6,350,504 B1 | 2/2002 | Alboom et al. |
| 6,436,506 B1 | 8/2002 | Pinter et al. |
| 6,660,352 B2 | 12/2003 | Hsu et al. |
| 6,676,796 B2 | 1/2004 | Pinter et al. |
| 6,770,581 B1 | 8/2004 | DeMott et al. |
| 6,924,000 B2 | 8/2005 | Tallmadge |
| 6,929,771 B1 | 8/2005 | Abrams |
| 6,977,023 B2 | 12/2005 | Abrams |
| 7,135,518 B2 | 11/2006 | Bandou et al. |
| 7,191,720 B2 | 3/2007 | Thomas |
| 7,338,697 B2 | 3/2008 | Abrams |
| 7,344,769 B1 | 3/2008 | Abrams |
| 7,351,368 B2 | 4/2008 | Abrams |
| 7,364,782 B2 | 4/2008 | Abrams |
| 7,378,043 B2 | 5/2008 | Hassan et al. |
| 7,381,284 B2 | 6/2008 | Abrams |
| 7,390,552 B2 | 6/2008 | Abrams |
| 7,393,576 B2 | 7/2008 | Abrams |
| 7,402,222 B2 | 7/2008 | Abrams |
| 7,410,682 B2 | 8/2008 | Abrams |
| 7,413,581 B2 | 8/2008 | Abrams |
| 7,465,485 B2 | 12/2008 | Abrams |
| 7,632,371 B2 | 12/2009 | Abrams |
| 7,749,589 B2 | 7/2010 | Abrams |
| 7,799,164 B2 | 9/2010 | Abrams |
| 8,007,889 B2 | 8/2011 | Abrams |
| 8,168,262 B2 | 5/2012 | Abrams |
| 8,206,800 B2 | 6/2012 | Abrams |
| 8,354,050 B2 | 1/2013 | Abrams |
| 8,475,905 B2 | 7/2013 | Abrams |
| 2001/0008039 A1 | 7/2001 | Alboom et al. |
| 2001/0008672 A1 | 7/2001 | Norvell et al. |
| 2002/0098329 A1 | 7/2002 | Abrams |
| 2003/0129353 A1 | 7/2003 | Abrams |
| 2004/0010093 A1 | 1/2004 | Wefringhaus et al. |
| 2004/0033334 A1 | 2/2004 | Merovitz |
| 2004/0050482 A1 | 3/2004 | Abrams |
| 2004/0055692 A1* | 3/2004 | Abrams ..................... 156/72 |
| 2004/0170799 A1 | 9/2004 | Carr et al. |
| 2004/0238103 A1 | 12/2004 | Cano |
| 2005/0000622 A1 | 1/2005 | Cano |
| 2005/0081985 A1 | 4/2005 | Abrams |
| 2005/0136211 A1 | 6/2005 | McGovern et al. |
| 2005/0260378 A1 | 11/2005 | Bernabeu |
| 2005/0268407 A1 | 12/2005 | Abrams |
| 2006/0010562 A1 | 1/2006 | Bevier |
| 2006/0026778 A1 | 2/2006 | Lion |
| 2006/0029767 A1 | 2/2006 | Lion |
| 2006/0160943 A1 | 7/2006 | Weir |
| 2006/0183851 A1 | 8/2006 | Liu et al. |
| 2006/0257618 A1 | 11/2006 | Pascual Bernabeu |
| 2007/0022510 A1 | 2/2007 | Chapuis et al. |

(56) References Cited

U.S. PATENT DOCUMENTS

| | | |
|---|---|---|
| 2007/0022548 A1 | 2/2007 | Abrams |
| 2007/0110949 A1 | 5/2007 | Abrams |
| 2007/0148397 A1 | 6/2007 | Abrams |
| 2007/0181241 A1 | 8/2007 | Kramer et al. |
| 2007/0289688 A1 | 12/2007 | Abrams |
| 2008/0003394 A1 | 1/2008 | Eke |
| 2008/0003399 A1 | 1/2008 | Abrams |
| 2008/0006968 A1 | 1/2008 | Abrams |
| 2008/0050548 A1 | 2/2008 | Abrams |
| 2008/0095973 A1 | 4/2008 | Abrams |
| 2008/0102239 A1 | 5/2008 | Abrams |
| 2008/0111047 A1 | 5/2008 | Abrams |
| 2008/0118695 A1 | 5/2008 | Jarvis et al. |
| 2008/0145585 A1 | 6/2008 | Abrams |
| 2008/0177415 A1 | 7/2008 | Rahimi |
| 2008/0250668 A1 | 10/2008 | Marvin et al. |
| 2009/0022929 A1 | 1/2009 | Kramer et al. |
| 2009/0124150 A1 | 5/2009 | Covelli et al. |
| 2009/0181599 A1 | 7/2009 | Farmer et al. |
| 2009/0239025 A1 | 9/2009 | Abrams |
| 2010/0055358 A1 | 3/2010 | Weaver et al. |
| 2010/0068447 A1 | 3/2010 | Abrams |
| 2010/0092719 A1 | 4/2010 | Abrams |
| 2010/0092720 A1 | 4/2010 | Abrams |
| 2010/0143669 A1 | 6/2010 | Abrams |
| 2010/0159185 A1 | 6/2010 | Cremin et al. |
| 2010/0173119 A1 | 7/2010 | Vitarana et al. |
| 2010/0233410 A1 | 9/2010 | Abrams |
| 2010/0316832 A1 | 12/2010 | Abrams |
| 2011/0052859 A1 | 3/2011 | Abrams |
| 2011/0168319 A1 | 7/2011 | Baqai et al. |
| 2012/0028003 A1 | 2/2012 | Abrams |

FOREIGN PATENT DOCUMENTS

| | | |
|---|---|---|
| EP | 0351079 | 1/1990 |
| EP | 0913271 | 10/1998 |
| EP | 0989227 | 3/2000 |
| EP | 1072712 | 1/2001 |
| EP | 1598463 | 11/2005 |
| FR | 2442721 | 8/1980 |
| FR | 2543984 | 10/1984 |
| FR | 2659094 | 9/1991 |
| FR | 2846202 | 4/2004 |
| FR | 2881149 | 7/2006 |
| GB | 1171296 | 11/1969 |
| GB | 1466271 | 3/1977 |
| GB | 2101932 | 1/1983 |
| GB | 2126951 | 4/1984 |
| JP | 55079143 | 6/1980 |
| JP | 55147171 | 11/1980 |
| JP | 56108565 | 8/1981 |
| JP | 56141877 | 11/1981 |
| JP | 61146368 | 7/1986 |
| JP | 62033576 | 2/1987 |
| JP | 64068582 | 3/1989 |
| JP | 01-192538 | 8/1989 |
| JP | 01-310947 | 12/1989 |
| JP | 02-048076 | 2/1990 |
| JP | 04-169297 | 6/1992 |
| JP | 05-201196 | 8/1993 |
| JP | 08-267625 | 10/1996 |
| JP | 11-042749 | 2/1999 |
| JP | 11-256484 | 9/1999 |
| JP | 3076851 | 8/2000 |
| JP | 2000-263673 | 9/2000 |
| JP | 2001-226885 | 8/2001 |
| JP | 2001-270019 | 10/2001 |
| KR | 2003063833 | 7/2003 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |

OTHER PUBLICATIONS

"Adhesives for Decorative Apparel for High Quality Embroidered Emblems, Patches, and Sports Lettering," Bemis, Feb. 2002, 2 pages.
"Clarense" advertisement, Bemis, available at www.bemisworldwide.com on Aug. 28, 2006, 2 pages.
"EB3106 Apparel Product Data Sheet." Bemis, May 10, 2008, 1 page.
"EB3302 Apparel Product Data Sheet." Bemis, Feb. 23, 2010, 1 page.
"EB3304 Data Sheet." Bemis, Dec. 11, 2007, 1 page.
"Selector Guide: Thermoplastic Adhesives, Specialty Films & Seam Tape," Bemis, Jan. 2009, 8 pages.
"Sewfree® Adhesive Film & Tape," Bemis, Jul. 2006, 4 pages.
"Sewfree® Adhesive Film & Tape," Bemis, Jul. 2008, 6 pages.
"Sewfree® designed especially for garments," Bemis, Aug. 2008, 6 pages.

* cited by examiner

FLOCKED ARTICLES HAVING A RESISTANCE TO SPLITTING AND METHODS FOR MAKING THE SAME

CROSS REFERENCE TO RELATED APPLICATIONS

The present application claims the benefit of U.S. Provisional Application Nos. 61/313,592 filed Mar. 12, 2010 and 61/326,885 filed Apr. 22, 2010 both entitled "Stretchable Flock Transfers Having a Resistance to Splitting and a Method for Making and Using the Same" and 61/356,425 filed Jun. 18, 2010, 61/358,679 filed Jun. 25, 2010, 61/364,312 filed Jul. 14, 2010, 61/373,738 filed Aug. 13, 2010, 61/377,790 filed Aug. 27, 2010, 61/378,751 filed Aug. 31, 2010, 61/380,892 filed Sep. 8, 2010, 61/381,360 filed Sep. 9, 2010, 61/385,760 filed Sep. 23, 2010, 61/389,544 filed Oct. 4, 2010, 61/392,837 filed Oct. 13, 2010, 61/405,558 filed Oct. 21, 2010, 61/422,979 filed Dec. 14, 2010 and 61/429,623 filed Jan. 4, 2011, each of which the entire contents are incorporated herein by this reference.

FIELD

This invention relates generally to flocked articles and methods for making the same, more particularly to flocked elastomeric and/or stretchable articles and methods for making the same.

BACKGROUND

It is often desirable to decorate consumer articles having stretch and/or elastomeric properties with flock containing appliqués. Stretchable flock appliqués have had limited application since the adhesive layer binding the textile to the stretchable and/or elastomeric material tends to split and/or crack when a linear or angular stress is applied, such as when the appliqué is pulled and/or twisted. Typically, the stress leads to splits and/or cracks forming within the adhesive layer binding the appliqué to the stretchable and/or elastomeric material. Not only do the splits and cracks detract from the artistic quality of design, the functional quality of the appliqué is degraded by the splits and cracks. For example, the splits and cracks may cause the appliqué to detach from the stretchable and/or elastomeric material. Furthermore, the adhesive layer may to fail to return to its original shape and/or size after the applied linear and/or angular stress is removed. This failure to return to its original shape and/or size may distort not only the appliqué, but also the stretchable and/or elastomeric material about the region where the appliqué is attached.

SUMMARY

These and other needs are addressed by the various aspects, embodiments, and configurations of the present disclosure. This disclosure relates generally to flocked articles and methods for making them.

Some embodiments relate to an article having a plurality of flock fibers and a self-supporting adhesive layer. The self-supporting adhesive layer has an obstructive film positioned between first and second adhesive films. The obstructive film is one or both of an elastomeric material and an opaque material. Preferably, the first and second adhesives comprise polyurethane. The first adhesive film has a first adhesive film thickness. Furthermore, the flock fibers have opposing first and second ends and a flock fiber length. The flock fibers are adhered to the first adhesive film. Preferably, the first adhesive film thickness is no more than about 125 μm. The flocked product may further comprise a rigid layer having a rigid, inelastic film and a third adhesive film. The rigid, inelastic layer is substantially rigid and inelastic. The rigid layer is adhered to the self-supporting adhesive layer by the second adhesive film. The flocked article may further include a stretchable and/or elastomeric substrate. In some embodiments, the stretchable and/or elastomeric substrate is adhered to the plurality of flock fibers by the third adhesive film and in other embodiments the stretchable and/or elastomeric substrate is adhered to the plurality of flock fibers by the second adhesive film.

In some embodiments, the first ends of the flock fibers are embedded in the first adhesive film to a depth of at least most, of the first adhesive film thickness. The first ends of the flock fibers are commonly embedded in the first adhesive film to a depth of at least about 50% of the first adhesive film thickness. Furthermore, the flock fibers may be in contact with the obstructive layer. Moreover, the flock fibers commonly do not penetrate the obstructive film.

In other embodiments, no more than about 1% of the flock length penetrates the first adhesive film. Preferably, the first ends of the plurality of the flock fibers are adhered the surface of the first adhesive film. More preferably, the first adhesive film is positioned between an obstructive film and the plurality of flock fibers.

In some embodiments the plurality of flock fibers are adhered to a first adhesive layer and a substantially rigid film is adhered to a second adhesive layer, positioned between the first and second layer is an elastic obstructive layer.

Other embodiments are directed to a process for making a flock product. The process includes: a) providing a plurality of flock fibers b) an obstructive film, and a first adhesive film; and c) embedding first ends of the plurality of the flock fibers into the first adhesive film. Moreover, the embedding step further includes applying at least one of heat and pressure to one or both of the plurality of flock fibers and the first adhesive film. The first ends of the flock fibers are embedded to a depth of at least through most of a thickness of the first adhesive film. The first ends are embedded in the first adhesive film while the first adhesive film is in physical contact with the obstructive film. Furthermore, the obstructive film is impregnable to flock fiber penetration when the flock fibers are embedded into or adhered to the self-supporting adhesive layer. The first adhesive film has a first adhesive film thickness, and the first ends are embedded in the first adhesive film to a depth of at least about 50% of the first adhesive film thickness. Furthermore, second fiber ends of the plurality of flock fibers are adhered to a carrier sheet by a release adhesive with the first and second fiber ends being in an opposing relationship. In some embodiments, the process includes contacting the second adhesive film with a stretchable and/or elastomeric textile material to adhere the plurality of flock fibers to the stretchable and/or elastomeric textile material. The obstructive film physically blocks flock fiber penetration onto the obstructive film when flock fibers are embedded in the first adhesive film.

In some embodiments, the process includes contacting the second adhesive film with a rigid and/or inelastic film adhered to third adhesive layer. The second and third adhesive films are positioned on opposing surfaces of the rigid and/or inelastic film. The third adhesive can further contact a stretchable and/or elastomeric textile material to adhere the plurality of flock fibers to the stretchable and/or elastomeric textile material.

These and other advantages will be apparent from this disclosure contained herein.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples. These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

DETAILED DESCRIPTION

Figure 1:
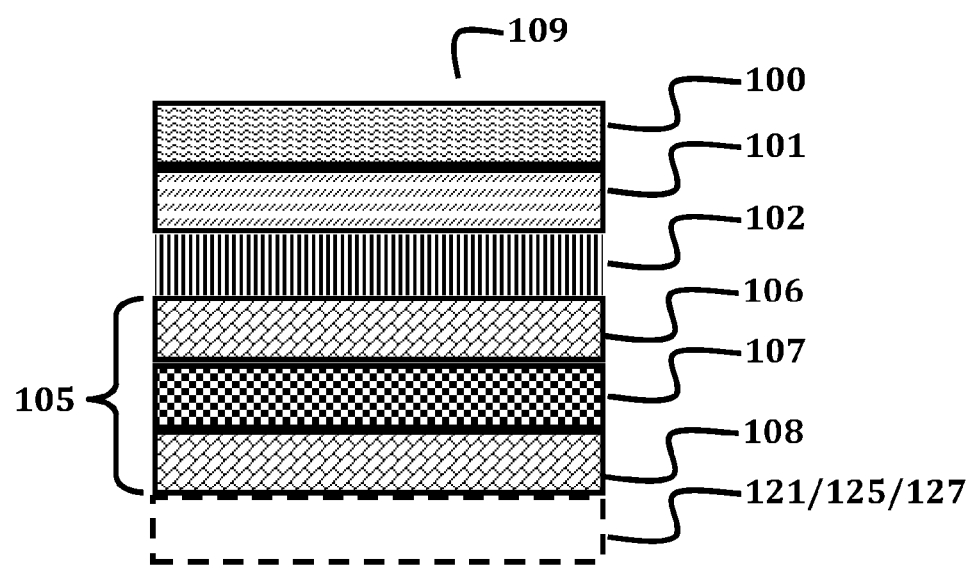
FIG. 1 is a cross-sectional view of a flocked product according to an embodiment.

FIG. 1 depicts a flocked product 109 according to an embodiment. The flock product 109 comprises a plurality of flock fibers adhered to a self-supporting adhesive layer 105. The flock fibers 102 have a flock fiber length 114 and opposing first 103 and second 104 fiber ends.

The flock product 109 may be adhered to at least one of an optional substrate 125, optional first carrier sheet 100, optional second carrier sheet 121, or optional rigid layer 127. In some embodiments, the self-supporting adhesive layer 105 is positioned between the plurality of flock fibers 102 and one or more of the optional substrate 125, second carrier sheet 121, or rigid layer 127.

Figure 29A:
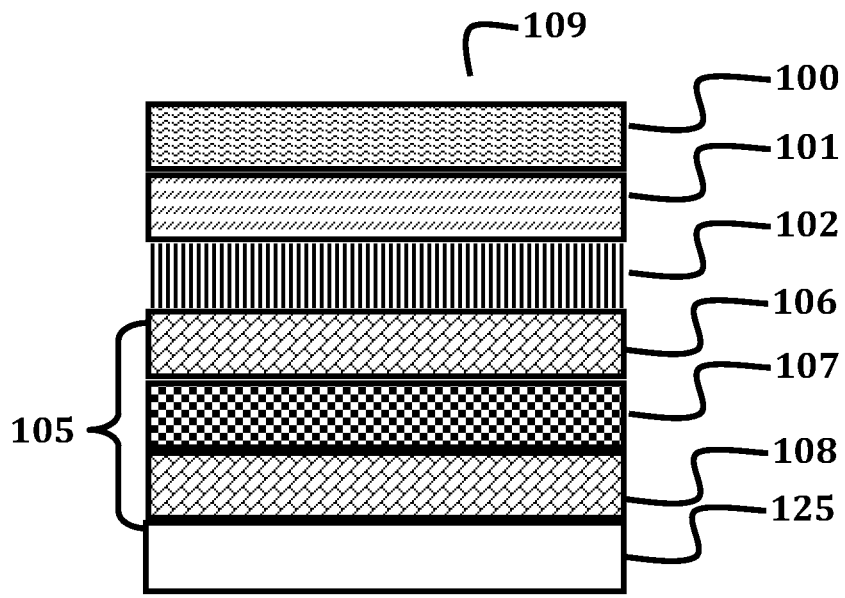
FIGS. 29A-29G depict cross-sectional views of various embodiments of the flock product and rigid layer.
Figure 29B:
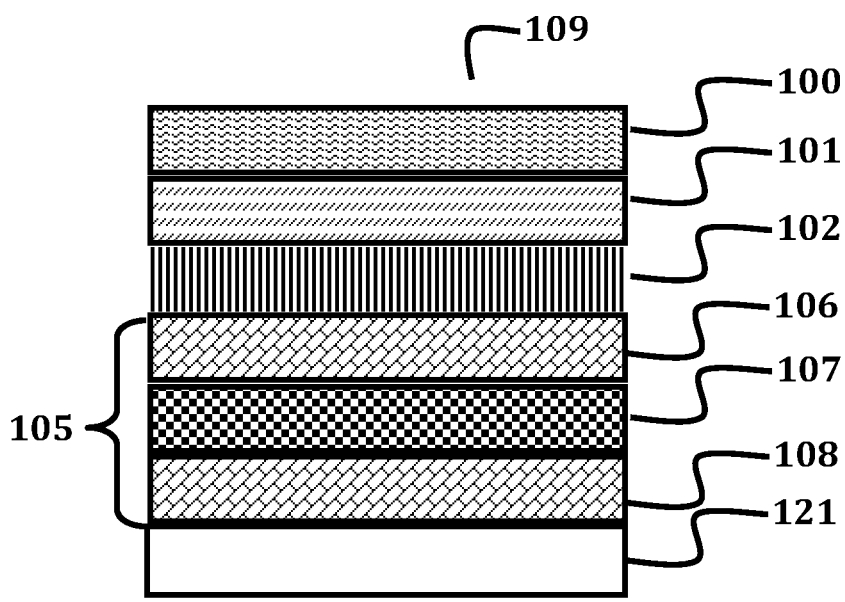
Figure 29C:
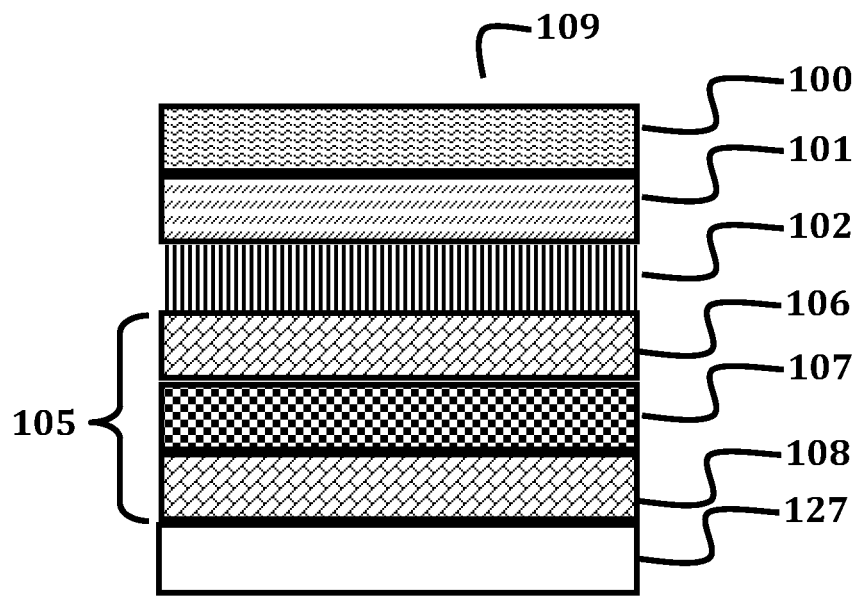

More specifically, the flock product 109 may comprise (a) the plurality of flock fibers 102 adhered to substrate 125 by the self-supporting adhesive film 105 as depicted in FIG. 29A, or (b) the plurality of flock fibers 102 adhered to the second carrier sheet 121 as depicted in FIG. 29B, or (c) the plurality of flock fibers 102 adhered to the rigid layer 127 as depicted in FIG. 29C.

In some embodiments, the flock product 109 can comprise an optional release adhesive 101 positioned between the optional first carrier sheet 100 and the plurality of flock fibers 102. The plurality of flock fibers 102 is adhered to the optional first carrier sheet 100 by the optional release adhesive 101.

Figure 29D:
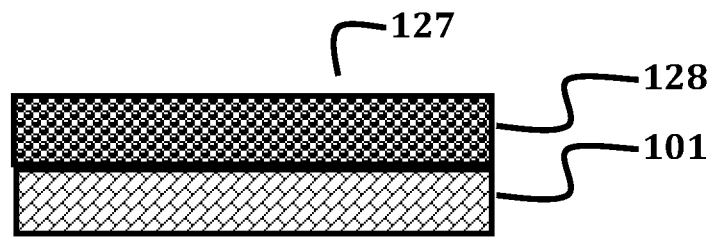
Figure 29E:
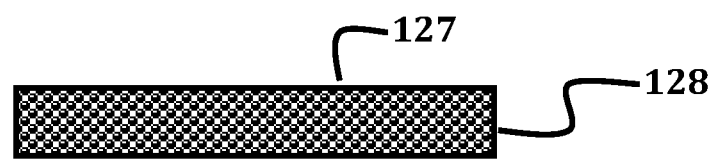
Figure 29F:
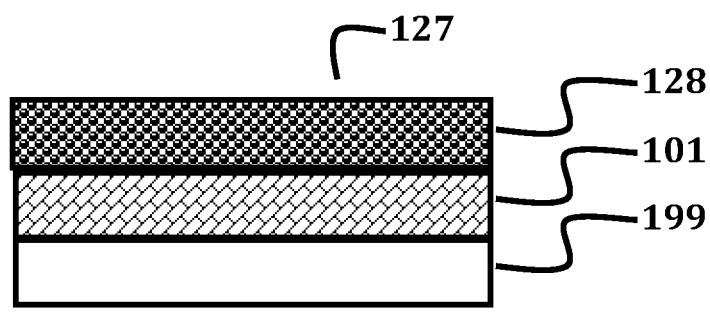

In some embodiments, the flocked product 109 can comprise the rigid layer 127 positioned between the self-supporting adhesive film 105 and the substrate 125. The rigid layer 127 can comprise a rigid, inelastic film 128 and a third adhesive film 129 (FIG. 29D). Preferably, the rigid, inelastic film 128 is adhered to the second 108 and the third 129 adhesive films. In other embodiments, the rigid layer 127 may lack the third adhesive film 129 (FIG. 29E). In other embodiments, the rigid layer 127 may further include a third carrier sheet 199 temporarily adhered to the third film adhesive film 129, the third adhesive film 129 being positioned between the rigid inelastic film 128 and the third carrier sheet 199 (FIG. 29F).

Preferably, the self-supporting adhesive layer 105 comprises an obstructive film 107 positioned between first 106 and second 108 adhesive films. The first 106 and second 108 adhesive films are substantially continuously distributed over an areal extent of the obstructive film 107. Furthermore, the first adhesive film 106 is substantially continuously distributed over an areal extent of an interface between the first adhesive film 106 and the flock fibers 102 to hold the flock fibers firmly in position. Moreover, the first 106 and second 108 adhesive films are substantially continuously distributed over their respective areal extents. The first 106 and second 108 adhesive films are substantially free of holes and/or voids over the areal extent of the first 106 and second 108 adhesive films. The first 106 and second 108 adhesives have viscosities to form substantially continuous layers. Moreover, the first and second adhesives have viscosities, when applied to the obstructive film 107, to form substantially continuous layers on the obstructive film 107. Like the first and second adhesives, the obstructive film is preferably a substantially continuously distributed cast or extruded film.

Figure 29G:
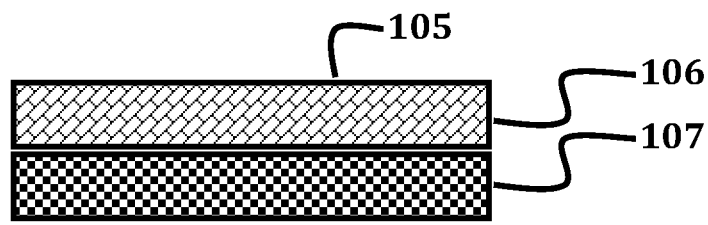

In some embodiments, the self-supporting adhesive layer 105 may comprise the first adhesive 106 and the obstructive film 107, that is, the self-supporting layer 105 lacks a second adhesive film 108 (see FIG. 29G). The second adhesive film 106 may be applied to obstructive film 107 subsequently.

The plurality of flock fibers 102 may be adhered to the substrate 125 by one of the second 108 or third 129 adhesive films. That is, substrate 125 is in contact with and adhered to one of the second 108 or third 129 adhesive films. The substrate 125 may comprise any material. Non-limiting examples of suitable substrate 125 materials comprise metallic materials, synthetic or natural polymeric materials, glass-based materials, ceramic materials, leather-based materials and combinations thereof. Furthermore, the substrate 125 may or may not be stretchable and/or have elastic properties.

Preferably, the substrate 125 is a textile material. The textile material can be woven, nonwoven, or knit. More preferably, the substrate 125 is a stretchable and/or elastomeric textile material, such as stretchable and/or elastomeric fabric and/or apparel item. Even more preferably, the substrate 125 comprises one or both of an elastomeric polymeric material and a stretchable-knit and/or stretchable-woven material.

Non-limiting examples of elastomeric polymeric materials comprise one or more of rubbers, polyisoprenes, polybutadinenes, styrene-butadienes, chloroprenes, ethylene propylene rubbers, ethylene-vinyl acetates, ethylene propylene diene rubbers, polyacrylic rubbers, epichlorohydrin rubbers, fluorosilicones, fluoroelasters, silicones, perfluoroelastomers, polyether block amides, chlorosulfonated polyethylenes and combinations thereof). Non-limiting examples of stretchable-knits/stretchable-weaves are sprang waves, mesh-weaves, open weaves, warp knits, and two-way knits. While not wanting to be limited by an example, suitable stretchable-knits/stretchable-weave textile materials are LYCRA™ (a trademark of Invista), an elastane containing material, Spandex™, 4-, 3-, 2-, or 1-way stretch fleece fabrics, and stretch cotton weaves (such as, stretch rayon jersey knit and/or cotton/LYRCA™ combinations).

In some embodiments, the stretchable and/or elastomeric material can be stretched to at least about 1.2 times of its original length in at least one direction, at least about 1.5 times of its original length in at least one direction, at least about 1.8 times of its original length in at least one direction or at least about 2.0 times of its original length in at least one direction. In some embodiments, the stretchable and/or elastomeric fabric post-stretched length, in the stretched direction, deviates from the pre-stretched length, in the stretched direction, commonly by no more than about 5%, more commonly by no more than about 2%, even more commonly by no more than about 1%, even more commonly by no more than about 0.5%, and even more commonly by no more than about 0.2%.

In some embodiments, the substrate 125 comprises an item of apparel, preferably a stretchable and/or elastomeric item of apparel. Non-limiting examples of stretchable items of apparel are jerseys, leotards, pants, shirts, blouses, leggings, socks, shoes, swim and/or beach wear, athletic apparel, medical, under garments, jackets, rain gear, sweaters, and accessories. Accessories can include, without limitation, hair-bands, wrist bands, head bands, finger bands, ankle bands, rain gear, finger bands, toe-bands, arm bands, and shoe-laces.

In other embodiments, the substrate 125 comprises non-apparel items, such as, but not limited to: dog leases, pet clothing, towels, bedding, upholstery (for home, automobile, office, garden, and beach), luggage (hard and soft), ladies handbags, recreational and sporting items, packing, totes and carpeting.

The substrate 125 may have a single surface or a plurality of surfaces. Non-limiting examples of a single-surfaced substrate 125 are substrates having one of a generally spherical, circular-donut, and elliptical-donut shapes. Non-limiting examples of substrate shapes having a plurality of substrate surfaces are substrates substantially resembling one of a cube, rectangular-box and tetrahedral shapes.

In some embodiments, the substrate 125 comprises a substantially thick textile material, such as, but not limited to, a high pile, or loosely and/or bulky woven or knitted textile. Non-limiting examples of a high pile substrate are sweat-bands and terrycloth items. The substantially thick textile material can provide a stable foundation and/or base for adhering the flock product 109. However, a substantially thick adhesive is preferred for adhering the flocked product to the substrate 125 having one or both of high pile and/or stretchable/elastomeric properties.

Preferably, the second adhesive film 108 or the third adhesive film 129 contacting the substrate 125 is substantially thick enough to penetrate at least some of the substrate 125 pile. By way of non-limiting example, the substrate 125 can have a pile thickness $T_{pile}$. Typically, the adhesive (one of second adhesive film 106 or third adhesive film 129) in contact with the substrate 125 has an adhesive thickness of about equal to $T_{pile}$, more typically the adhesive in contact with the substrate has a thickness of about ½ of $T_{pile}$, even more typically the adhesive in contact with the substrate has a thickness of about ¼ of $T_{pile}$, yet even more typically the adhesive in contact with the substrate has a thickness of about ⅙ of $T_{pile}$, still yet even more typically the adhesive in contact with the substrate has a thickness of about ⅛ of $T_{pile}$, still yet even more typically the adhesive in contact with the substrate has a thickness of about ⅛ of $T_{pile}$, still yet even more typically the adhesive in contact with the substrate has a thickness of about 1/10 of $T_{pile}$, still yet even more typically the adhesive in contact with the substrate has a thickness of about 1/15 of $T_{pile}$, still yet even more typically the adhesive in contact with the substrate has a thickness of about 1/20 of $T_{pile}$, still yet even more typically the adhesive in contact with the substrate has a thickness of about ⅓₀ of $T_{pile}$, yet even more typically the adhesive in contact with the substrate has a thickness of about ¹⁄₄₀ of $T_{pile}$, yet even more typically the adhesive in contact with the substrate has a thickness of about ¹⁄₅₀ of $T_{pile}$, yet even more typically the adhesive in contact with the substrate has a thickness of about ¹⁄₆₀ of $T_{pile}$, or yet even more typically the adhesive in contact with the substrate has a thickness of about ¹⁄₆₄ of $T_{pile}$.

Figure 27:
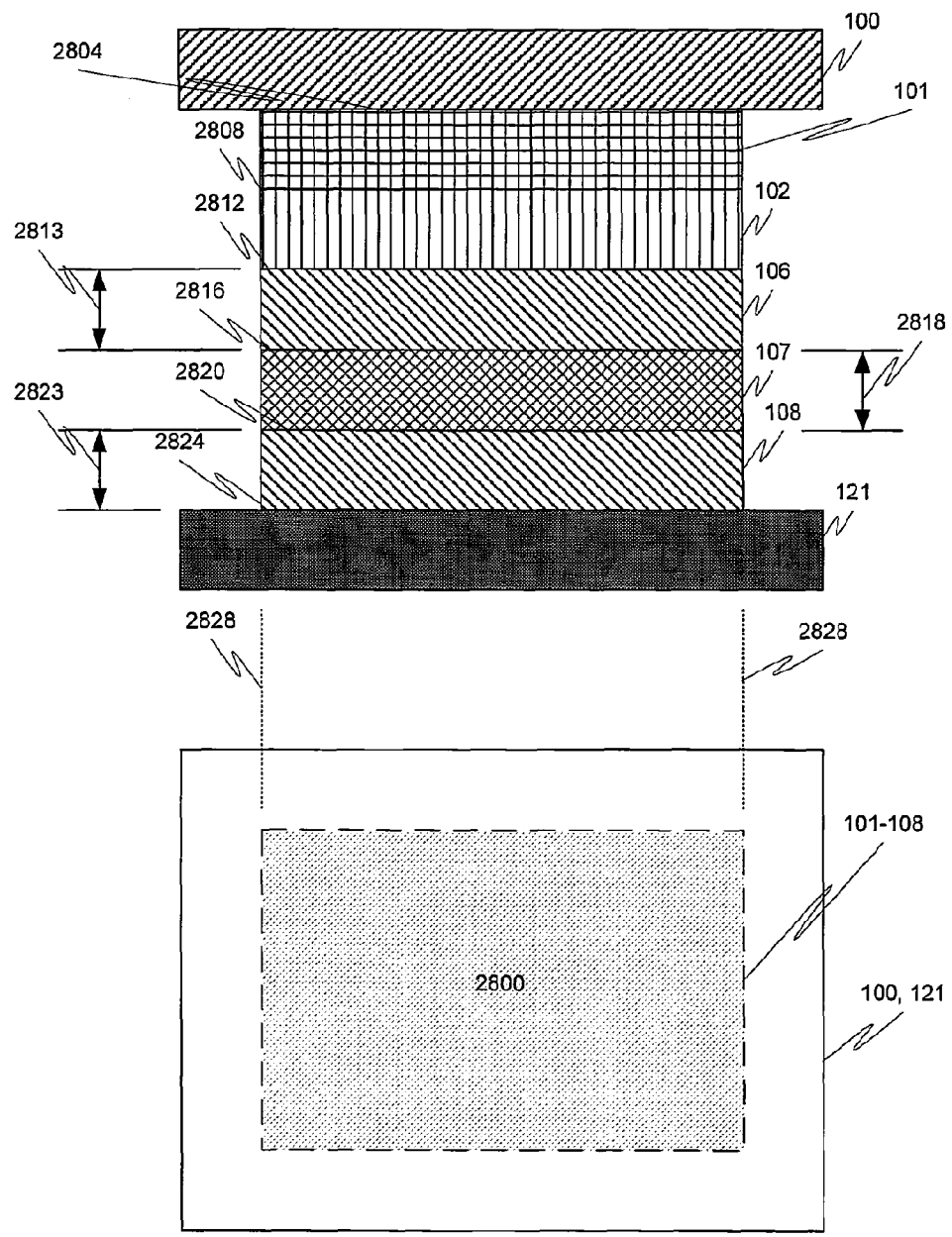
FIG. 27 depicts a cross-sectional and plan view of flocked product of FIG. 1.

FIG. 27 depicts an areal extent 2800 for one of a) a surface area defined by an area of the first adhesive film 106 in contact with the plurality of flock fibers 102 (hereafter first areal extent) and/or b) a surface area of obstructive film 107 (hereafter second areal extent). The first 106 and second 108 adhesive films are, respectively, substantially continuously distributed over areal the first and second extents 2800. Although the first and second areal extents are shown as being conterminous, this is not necessarily the case. The first and second areal extents can have differing sizes. In some embodiments, the first 106 and second 108 adhesive films are, respectively, substantially elastic and continuous over the first areal extend. In another embodiment, the first 106 and second 108 adhesive films are, respectively elastic and continuous over the second areal extent.

The first adhesive film 106 has opposing upper 2812 and lower 2816 first adhesive surfaces and a first adhesive film thickness 2813. Furthermore the second adhesive film 108 has opposing upper 2820 and lower 2824 second adhesive surfaces and a second adhesive film thickness 2823.

In some embodiments, the first 106 and second 108 adhesive films are substantially free of holes and/or voids, respectively, extending through the first 2813 and second 2823 adhesive thicknesses. That is, the first 106 and second 108 adhesive films are substantially continuously distributed and substantially free of holes and/or voids extending through their respective (2813 and 2823) film thicknesses and throughout their areal extents 2800. Substantially free of holes and/or voids means that on a macroscopic level (that is, not a microscopic and/or molecular level) one or both of the first 106 and second 108 adhesive film thicknesses, respectively, 2813 and 2823, are respectively greater than zero substantially over at least most, if not all, locations of areal extents 2800. Stated another way, in some embodiments, the first 106 and second 108 adhesive films, respectively, have fewer than about 10, even more preferably, no more than about 5, and even more preferably, no more than about 1, and even more preferably, no holes and/or voids, visible to an un-aided eye of an ordinary human observer, per square centimeter surface area of the areal extent 2800.

In some embodiments, the first 106 and second 108 adhesive films each, respectively, have no more than about 1 hole and/or void visible to an un-aided eye of ordinary human observer over the surface area of the areal extent 2800.

In another embodiment, the upper 2812 and lower 2816 first adhesive interfaces are substantially free of interfacial voids and/or valleys. Furthermore, the upper 2820 and lower 2824 second adhesive surfaces are substantially free voids and/or valleys. That is, the upper 2812 and lower 2816 first adhesive surfaces are substantially planar and/or flat. Furthermore, the upper 2820 and lower 2824 second adhesive surfaces are substantially planar and/or flat.

Each of the first 106 and second 108 adhesive films, respectively have minimum and maximum film thickness values. In some embodiments, the minimum film thickness commonly will be no less than about 25%, more commonly no less than about 50%, even more commonly no less than about 75%, and still even more commonly no less than about 90% of the maximum film thickness for one or both of the first 106 and second 108 adhesive films.

Figure 28:
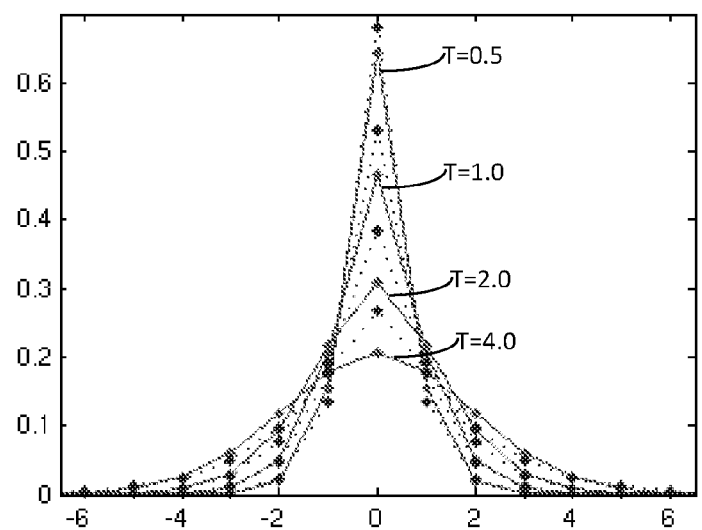
FIG. 28 depicts a Gaussian distribution having various t values.

A plurality of film thickness values measured over the areal extent 2800 for one or both of the first 106 and second 108 adhesive films may be represented by a Gaussian distribution, the Gaussian distribution typically has a "t" value (FIG. 28). In some embodiments, the Gaussian "t" value for at least one of the first and second adhesive films is typically less than about 4, more typically less than about 2, even more typically less than about 1, and even more typically less than about 0.5.

One or both of the first 106 and second 108 adhesive layers may have elastomeric properties. Preferably, the elastomeric properties of the first 106 and/or second 108 adhesive films are substantially independent of any discontinuities that may exist within either of the adhesive films. More specifically, the elastomeric properties of the first 106 and second 108 adhesive films are due substantially to one or both chemical and physical properties of the adhesive materials, respectively, comprising the first 106 and second 108 adhesive films. That is, the first 106 and second 108 adhesive films are substantially elastomeric with or without discontinuities present within the first 106 and second 108 adhesive films.

In some embodiments, the thicknesses of the first 106 and second 108 adhesive films are about substantially equivalent and in others the adhesive film thicknesses substantially differ. Preferably, at least one of the first 106 and second 108 adhesive films commonly has a thickness from about 5 to about 1,000 μm, more commonly from about 10 to about 750 μm, even more commonly from about 15 to about 500 μm, yet more commonly from about 20 to about 250 μm, or still yet even more commonly from about 20 to about 250 μm. Preferably, the at least one of the first 106 and second 108 adhesive films has a thickness of about 125 μm. Preferably, in some embodiments, the first adhesive film 106 thickness is sufficiently thin that the first adhesive film 106 will not over-penetrate between the plurality of flock fibers to create aesthetic issues, such as, but not limited to matting, stiffness and/or lack of plushness of the flock.

The third adhesive film 129 can have a thickness about equal to one of the first 106 and second 108 adhesive films or can have a thickness differing from one or both of the first 106 and second 108 adhesive films. Preferably, the third adhesive film thickness is greater than one or both of the first 106 and second 108 adhesive films. Commonly the third adhesive film 129 has a thickness from 10 to about 1,500 μm, more commonly from about 20 to about 1,000 μm, even more commonly from about 30 to about 750 μm, yet more commonly from about 35 to about 500 μm, or still yet even more commonly from about 40 to about 250 μm. Preferably, the third adhesive film 129 has a thickness of about 200 μm.

Each of the first 106, second 108 and third 129 adhesive films, respectively, have one or both of a melt viscosity, at a given temperature, and a melt flow index. In some embodiments, the first adhesive film 106 has a lower than a melt viscosity, or melt flow index than the second adhesive film 108.

The obstructive film 107 has an obstructive film thickness 2818 and opposing upper 2816 and lower 2819 obstructive film surfaces. In a preferred embodiment, the obstructive film 107 is substantially free of holes and/or voids, respectively, extending through the obstructive film thicknesses 2818. That is, the obstructive film 107 is substantially continuously distributed and substantially free of holes and/or voids extending through its film thicknesses 2818 and throughout its areal extent 2800. Substantially free of holes and/or voids means that on a macroscopic level (that is, not a microscopic and/or molecular level) the obstructive film thicknesses 2818 is greater than zero substantially over at least most, if not all, locations of areal extent 2800. In some embodiments, the obstructive film 107 typically has on more than about 10 visible holes and/or more typically no more than about 5 visible holes and/or voids, even more typically no more than about 1 visible hole and/or void, and yet even more typically no holes and/or voids per square centimeter surface area of the areal extent 2800 visible to an un-aided eye of ordinary human observer. In other embodiments, the upper 2816 and lower 2819 obstructive film surfaces are substantially free of voids and/or valleys within the surface. That is, the upper 2816 and lower 2819 obstructive film surfaces are substantially planar and/or flat.

The obstructive film thickness 2818 has minimum and maximum obstructive film thickness values. In some embodiments, the minimum obstructive film thickness commonly will be no less than about 25%, more commonly no less than about 50%, even more commonly no less than about 75%, or still even more commonly no less than about 90% of the maximum obstructive film thickness.

Generally, a thickness of the obstructive film 107 will exceed the thicknesses of each of the first 106 and second 108 adhesive films but the sum of the first adhesive film thickness 2813 and the second adhesive film thickness 2823 is about equal to or greater than the obstructive film thickness 2818. In some embodiments, the obstructive film thickness is commonly from about 15 to about 1,000 μm, more commonly from about 25 to about 500 μm, even more commonly from about 75 to about 200 μm, yet more commonly from about 50 to about 150 μm or yet more commonly from about 50 to about 75 μm. Preferably, the obstructive film thickness is one of about 50 μm or about 75 μm.

In other embodiments, the obstructive film thickness is commonly from about 375 to about 750 μm, or more commonly from about 400 to about 750 μm. Preferably, the obstructive film thickness is about 575 μm.

A plurality of film thickness values measured over the areal extent 2800 of the obstructive film 107 may be represented by a Gaussian distribution, the Gaussian distribution typically has a "t" value (FIG. 28). In some embodiments, the Gaussian "t" value for at least one of the first and second adhesive films is typically less than about 4, more typically less than about 2, even more typically less than about 1, and even more typically less than about 0.5.

The phrase "substantially continuous" means that a film or layer substantially covers and/or coats the entire areal interface 2800 of a surface over which the film or layer is said to be substantially continuous. Moreover, "substantially continuous" means the film or layer is substantially free of holes and/or voids.

The rigid, inelastic film 128 of the rigid layer 127 comprises one or both of a metallic layer and a polymeric layer. Preferably, the rigid, inelastic film 128 is one or both of substantially rigid and inelastic. While not wanting to be limited by an example, when a stress is applied to the rigid, inelastic film 128, the rigid, inelastic film 128 commonly has an elongation value due to the stress of no greater than about 1.4 compared to an opaque layer without the applied stress, the rigid, inelastic film 128 commonly has an elongation value due to the stress of no greater than about 1.3 compared to an opaque layer without the applied stress, the rigid, inelastic film 128 more commonly has an elongation value due to the stress of no greater than about 1.2 compared to an opaque layer without the applied stress, the rigid, inelastic film 128 even more commonly has an elongation value due to the stress of no greater than about 1.1 compared to an opaque layer without the applied stress, the rigid, inelastic film 128 yet even more commonly has an elongation value due to the stress of no greater than about 1.05 compared to an opaque layer without the applied stress, the rigid, inelastic film 128 still yet even more commonly has an elongation value due to the stress of no greater than about 1.03 compared to an opaque layer without the applied stress, the rigid, inelastic film 128 still yet even more commonly has an elongation value due to the stress of no greater than about 1.02 compared to an opaque layer without the applied stress, the rigid, inelastic film 128 still yet even more commonly has an elongation value due to the stress of no greater than about 1.01 compared to an opaque layer without the applied stress, or the rigid, inelastic film 128 still yet even more commonly has an elongation value due to the stress of no greater than about 1.00 compared to an opaque layer without the applied stress.

In some embodiments, the rigid layer 127 can be substantially non-rigid and elastic. In such embodiments, the rigid layer 127 commonly has an elongation value in at least one direction from about 105% to about 600%, more commonly from about 110% to about 500%, even more commonly from about 120% to about 200%, yet even more from about 130% to about 190%, still yet even more commonly from about 140% to about 180%.

The rigid, inelastic film 128 can comprise any polymeric material. Preferably the rigid, inelastic film 128 polymeric material comprises one or more of a homopolymer, copolymer, polymer alloy or a combination thereof, and wherein the polymeric material comprises one or more of vinyl esters, epoxies, polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More preferably, the rigid, inelastic film 128 polymeric material is one or both of substantially rigid and inelastic. More specifically, the polymeric material comprising the rigid, inelastic film 128 is substantially inelastic as described above.

In some embodiments, the rigid, inelastic film 128 can comprise a metallic film. Preferably, the rigid, inelastic film 128 comprises a metallic film and a polymeric material, more preferably a metallic film supported by the polymeric material. A non-limiting example of metallic film containing rigid, inelastic film 128 comprises polyethylene terphthalate having a metallic film on at least one side of polymeric film.

Preferably, the flocked product 109 having a substantially rigid and/or inelastic rigid layer 127 is substantially resistant to one or both of splitting and delamination of the flock fibers from the substrate 125. More specifically, the rigid and/or inelastic adhesive film 127 substantially reduces splitting and/or delamination of the flock fibers from a substantially elastomeric and/or stretchable substrate 125. The rigid and/or inelastic film 127 can reduce stresses imparted to the flock fibers when stress is applied to the substantially elastomeric and/or stretchable substrate 125. More specifically, when a stress is applied to the elastomeric and/or stretchable substrate 125, the applied stress can affect the adherence of the flock fibers to the substrate 125. Furthermore, the substantially rigid and/or inelastic adhesive film 127 can reduce distortion of the flocked product 109 when a stress is applied to the substrate 125. The reduced distortion of the flocked product 109 is advantageous in retaining the integrity of the flocked product 109, more specifically the artistic integrity and value of the flocked product 109.

Typically a flock product 109 adhered to a substrate 125 by a substantially rigid and/or inelastic adhesive film 127 is substantially free of one or more of splitting, delamination and distortion after applying at least one cycle of an elongation or angular stress to the substrate 125, more typically a flock product 109 adhered to a substrate 125 by a substantially rigid and/or inelastic adhesive film 127 is substantially free of one or more of splitting, delamination and distortion after repeatability applying at least 10 times elongation and/or angular stresses to the substrate 125, even more typically a flock product 109 adhered to a substrate 125 by a substantially rigid and/or inelastic adhesive film 127 is substantially free of one or more of splitting, delamination and distortion after repeatability applying at least 100 times elongation and/or angular stresses to the substrate 125, yet even more typically a flock product 109 adhered to a substrate 125 by a substantially rigid and/or inelastic adhesive film 127 is substantially free of one or more of splitting, delamination and distortion after repeatability applying at least 500 times elongation and/or angular stresses to the substrate 125, still yet even more typically a flock product 109 adhered to a substrate 125 by a substantially rigid and/or inelastic adhesive film 127 is substantially free of one or more of splitting, delamination and distortion after repeatability applying at least 1,000 times elongation and/or angular stresses to the substrate 125, or still yet even more typically a flock product 109 adhered to a substrate 125 by a substantially rigid and/or inelastic adhesive film 127 is substantially free of one or more of splitting, delamination and distortion after repeatability applying at least 5,000 times elongation and/or angular stresses to the substrate 125.

Returning to the flocked product 109 depicted in FIG. 1, the first fiber ends 103 of the flock fibers 102 are embedded in the first adhesive film 106 and the plurality of flock fibers 102 are adhered to the self-supporting adhesive layer 105 by the second fiber ends 104. At least some of the flock fiber length is embedded in first adhesive film 106. In some embodiments, typically no more than about 40% of the flock fiber length is embedded in the first adhesive film 106, more typically no more than about 35% of the flock fiber length is embedded in the first adhesive film 106, even more typically no more than about 25% of the flock fiber length is embedded in the first adhesive film 106, yet even more typically no more than about 15% of the flock fiber length is embedded in the first adhesive film 106, still yet even more typically no more than about 10% of the flock fiber length is embedded in the first adhesive film 106, still yet even more typically no more than about 5% of the flock fiber length is embedded in the first adhesive film 106, still yet even more typically no more than about 3% of the flock fiber length is embedded in the first adhesive film 106, or still yet even more typically no more than about 1% or less of the flock fiber length is embedded in the first adhesive film 106 to preserve the soft touch of the flocked surface.

In some embodiments, the flocked product 109 plushness can be enhanced by adhering the first fiber ends 103 to the upper first adhesive film surface 112 or by typically embedding the first fibers 103 no more than about 1% of the flock fiber length 114 in the first adhesive film 106, more typically embedding the first fibers 103 no more than about 2% of the flock fiber length 114 in the first adhesive film 106, even more typically embedding the first fibers 103 no more than about 3% of the flock fiber length 114 in the first adhesive film 106, yet even more typically embedding the first fibers 103 no more than about 5% of the flock fiber length 114 in the first adhesive film 106, yet even more typically embedding the first fibers 103 no more than about 8% of the flock fiber length 114 in the first adhesive film 106, or still yet even more typically embedding the first fibers 103 no more than about 10% of the flock fiber length 114 in the first adhesive film 106.

In some embodiments, typically the first fiber ends 103 are embedded in the first adhesive film 106 to a depth of at least about 5% of the first adhesive film thickness 2813, more typically the first fiber ends 103 are embedded in the first adhesive film 106 to a depth of at least about 10% of the first adhesive film thickness 2813, even more typically the first fiber ends 103 are embedded in the first adhesive film 106 to a depth of at least about 25% of the first adhesive film thickness 2813, yet even more typically the first fiber ends 103 are embedded in the first adhesive film 106 to a depth of at least about 50% of the first adhesive film thickness 2813, still yet even more typically the first fiber ends 103 are embedded in the first adhesive film 106 to a depth of at least about 75% of the first adhesive film thickness 2813, still yet even more typically the first fiber ends 103 are embedded in the first adhesive film 106 to a depth of at least about 85% of the first adhesive film thickness 2813, yet still even more typically the first fiber ends 103 are embedded in the first adhesive film 106 to a depth of at least about 90% of the first adhesive film thickness 2813, still yet even more typically the first fiber ends 103 are embedded in the first adhesive film 106 to a depth of at least about 95% of the first adhesive film thickness 2813, or still yet even more typically the first fiber ends 103 are embedded in the first adhesive film 106 to a depth of at least about 98% of the first adhesive film thickness 2813.

It can be appreciated that the fiber length embedded in the first adhesive film 106 can depend on one or both pressure and temperature applied to embed the flock fibers in the first adhesive film 106 and the first adhesive 106 physical properties during the embedding process.

Furthermore, in some embodiments, the flock fiber length embedded in the first adhesive first adhesive film 106 is limited by the obstructive film 107. The obstructive film 107 is substantially impregnable and impervious to flock fiber penetration. More specifically, the obstructive film 107 is impregnable and impervious to flock fiber penetration under the pressure and temperature applied to embed the flock fibers in the first adhesive film 106. It can be appreciated that the obstructive film 107 can be a barrier which limits flock fiber length penetration in one or both of the first adhesive film 106 or the self-supporting adhesive layer 105.

It can be appreciated that the obstructive film 107 is one or more of substantially impregnable, impervious and impenetrable to flock fiber penetration or passage. Moreover, the obstructive film 107 is substantially resistant to flock fiber penetration of the obstructive film 107. It can be appreciated that the obstructive film 107 substantially blocks flock fiber penetration beyond the first adhesive film 106. That is the obstructive film 107 can be a barrier to flock fiber penetration.

The plurality of flock fibers 102 form a flock layer 111 having a plurality of interstitial voids 110, the plurality of interstitial voids has an interstitial void volume. Preferably, substantially some of the first adhesive film 106 flows into at least some the interstitial void volume. More preferably, substantially most if not all of the first adhesive film 106 flows into at least some the interstitial void volume.

In embodiments optionally comprising the release adhesive 101 and first carrier sheet 100, the second fiber ends 104 of the flock fibers are in contact with the release adhesive 101 and adhered to the first carrier sheet 100 by the release adhesive 101. The first carrier sheet 100 may be any material that is dimensionally stable under the conditions of temperature and pressure encountered during any of the processing conditions presented herein. Preferably, the first carrier sheet 100 is a porous, typically substantially inelastic film, such as a porous film discussed by Pekala in U.S. Pat. No. 6,025,068. A particularly preferred the porous sheet is sold by PPG Industries Inc. under the trade name TESLIN™. Battery separator membranes may also be used as the first carrier sheet 100. Examples include Daramic Industrial CL™ sold by Daramic, Inc., and the battery separator membranes sold by Celgard or by Daramic, Inc. under the trade name Artisyn™. Artisyn™ is an uncoated, monolayer, highly filled polyolefin sheet. Typically, but not always, the first carrier sheet 100 is a discontinuous as opposed to a continuous sheet on a running web line. The first carrier sheet 100 maybe any low-cost, dimensionally stable substrate, such as paper, plastic film, and the like, preferably in the form of a discontinuous sheet or a running web line material.

The release adhesive 101 is selected such that the bonding force between the release adhesive 101 and the plurality of flock fibers 102 is less than the bonding force between the self-supporting adhesive layer 105 and the plurality of flock fibers 102. The release adhesive 101 may be any adhesive that adheres more strongly to the first carrier sheet 100 than the plurality of flock fibers 102 but adheres to both enough to hold them together. For example, the release adhesive 101 may be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients. Preferably, the release adhesive 101 is a water-based adhesive, that is the release adhesive 101 is one or more of dispersed, dissolved, suspended or emulsified within water.

The plurality of flock fibers 102 may be formed from any natural or synthetic material. Synthetic material includes, without limitation, vinyl, rayons, nylons, polyamides, polyesters such as terephthalate polymers, such as poly(ethylene terephthalate) and poly(cyclohexylene-dimethylene terephthalate), and acrylic, and natural material includes cotton and wool. In one configuration, a conductive coating or finish is applied continuously or discontinuously over the exterior surface of the flock fibers 102 to permit the flock fibers 102 to retain an electrical charge.

The flock fibers 102 may be pre-colored (yarn-dyed or spun dyed) before contacting one or both of the release adhesive 101 or the self-supporting adhesive layer 105 or after the first carrier sheet 100 is removed, such as by sublimation dye transfer printed.

Preferably at least most, and even more preferably at least about 75%, and even more preferably all, of the flock fibers 102 have a preferred denier of no more than about 60, more preferably no more than about 25, and even more preferably no more than about 5, with a range of from about 1.5 to about 3.5 being typical and have a titre ranging from about 0.5 to about 20 Dtex (from about 0.5 to about $20 \times 10^{-7}$ Kg/m) and even more preferably from about 0.9 Dtex to about 6 Dtex. The length of at least most, and typically at least about 75%, of the flock fibers 102 is preferably no more than about 4 mm, more preferably no more than about 2 mm, and even more preferably no more than about 1 mm, with a range of from about 0.3 to about 3.5 mm being typical. The flock fiber placement density relative to the surface area of the flocked portion (on which the flock is deposited) of the flocked product 109 is preferably about 50% fibers/in$^2$, even more preferably at least about 60% fibers/in$^2$, and even more preferably at least about 70% fibers/in$^2$ of the flocked surface area.

In some embodiments, the self-supporting adhesive layer 105 may be supplied as a bi-layered or tri-layered film. Furthermore, in some embodiments, one or more of the films comprising the self-supporting adhesive layer 105 is a cast film. Moreover, in other embodiments, one or more of the films comprising the self-supporting adhesive layer 105 is a blown film. In a blown film operation, two or more of the films are coextruded and become welded together during the production. For example, a base film can be cast or extruded and a second film extruded or coated onto the base film, such as first or second adhesive film or elastomeric film. A third film would require a third pass.

When the self-supporting adhesive layer 105 is supplied as tri-laminate film, it may be supplied with or without a second substantially inelastic, carrier sheet 121. Preferably, the second carrier sheet 121 is positioned on at least one of the first 106 and second 108 adhesive films. The second carrier sheet 121 may comprise any of the materials described above for the first carrier sheet 100.

When the self-supporting adhesive layer 105 is supplied as a bi-layer film, the bi-layer film may comprise the first 106 and second 108 adhesive films without the obstructive film 107 therebetween or the bi-layer film may comprise the first adhesive film 106 and the obstructive film 107. When the bi-layer film comprises the first adhesive film 106 and the obstructive film 107, one of ordinary skill in art would understand that the second adhesive film 108 may be provided during one of the processes and/or systems described herein to form the tri-layered self-supporting, elastomeric layer 105 within the products, articles, processes and systems described herein.

In some embodiments, the self-supporting adhesive layer 105 has an adhesive layer thickness of "$T_{ea}$". Preferably, the first adhesive film 106 has a thickness of less than about ⅓ the value of $T_{ea}$. More preferably, the first adhesive film 106 has a thickness of less than about ⅕ the value of $T_{ea}$. Even more preferably, the first adhesive film 106 has a thickness of less than one or more of about ⅐, ⅛, ⅑, ¹⁄₁₀, ¹⁄₁₅, ¹⁄₂₀, and/or ¹⁄₂₅ the value of $T_{ea}$. Preferably, the second adhesive film 108 has a thickness of less than about ⅓ the value of $T_{ea}$. More preferably, the second adhesive film 108 has a thickness of less than about ⅕ the value of $T_{ea}$. Even more preferably, the second adhesive film 108 has a thickness of one or more of ⅐, ⅛, ⅑, ¹⁄₁₀, ¹⁄₁₅, ¹⁄₂₀, ¹⁄₂₅, and/or ¹⁄₅₀ the value of $T_{ea}$.

At least one, if not both, of self-supporting adhesive layer 105 and the obstructive film 107 should be durable, thermally stable, and able to resist the various treatments including but not limited to flocking and/or lamination process, applying chemicals, washing, heating, drying, both during the flocking process and after the design or transfer has been heat applied to the article. In some embodiments the self-supporting adhesive layer 105 has a modulus of elasticity of less than about 11.25 pounds per foot ("lbf") (50 N). Commonly the modulus of elasticity is from about 2 N to about 50 N, more commonly the modulus of elasticity is from about 5 N to about 30 N, or even more commonly the modulus of elasticity is from about 8 N to about 25 N. The modulus of elasticity for the material selected is preferably above about 0.5 lbf (2.22 N) (where the modulus is defined as the force required to pull a ¼ inch sample from 3 inches to 6 inches). Those of ordinary skill in the art recognize that the modulus of elasticity (sometimes also referred to as Young's Modulus) is a fundamental material constant and that the modulus is an index of the stiffness of the material. A higher value of the modulus indicates a more brittle material (i.e. glass, ceramics). A very low value represents an elastomeric material (i.e. rubber).

In embodiments where the self-supporting adhesive film 105 has elastomeric properties, the self-supporting adhesive layer 105 preferably has an elongation of at least about 200% and more preferably at least about 300% and a recovery of at least about 75% and more preferably at least about 95% at such elongations. The recovery is the percent of the film's shape retained after the film is stretched to 100% of its original length at a rate of 30 inches per minute and the stretched film allowed to retract freely for 1 minute.

In some embodiments, the self-supporting adhesive layer 105 may be formed by applying, such as by printing, screen-printing, applying, or depositing the first adhesive film 106 to a base material, such as, but not limited to, the second carrier sheet 121, an item of apparel, or item of commerce. Thereafter, contacting and/or applying the second adhesive film 108 to the obstructive film 107, such that the first 106 and second 108 adhesive films are positioned on opposing surfaces of the obstructive film 107. It can be appreciated that the self-supporting adhesive layer 105 may be formed by different processes, such as, but not limited to: a) applying and/or contacting the first adhesive film 106 with the obstructive film 107 prior to contacting and/or applying the first adhesive film 106 to the base material; b) applying and/or contacting the second adhesive film 108 with the obstructive film 107 prior to contacting and/or applying obstructive film 107 with the first adhesive film 106; or c) substantially contacting and/or forming (such as by extrusion) the obstructive film 107 with the first 106 and second 108 adhesive films. In a preferred embodiment, the first 106 and second 108 adhesive films are applied as water-based suspensions, emulsions, or dispersions. The first 106 and second 108 adhesive films further form as the water is removed (through evaporation or applying of heat) from the as applied water-based suspensions, emulsions, or dispersions.

In some embodiments, each of the first 106, second 108 and third 129 adhesive films comprises one of a thermosetting, a thermoplastic or combination thereof adhesive. Preferably, the first 106, second 108 and third 129 adhesive films comprise thermoplastic adhesives. As used herein, a thermoplastic material refers to a material that will repeatedly soften when heated and hardened with cooled. As a used herein, a thermosetting material refers to a material that will undergo or has undergone a thermosetting chemical reaction by the action of heat, catalyst, ultraviolet energy or such. The thermosetting chemical reaction forms a relatively infusible state.

The first 106 and second 107 adhesive films may be the same or differ in one or more chemical and/or physical properties. Preferably, the first 106 and second 107 adhesive films have substantially the same chemical and/or physical properties. The third adhesive film 129 can differ from or can be substantially the same the first 106 and second 107 adhesive films. A chemical property refers to a chemical reactivity property associated with one of the adhesive films. A physical property refers to a property not associated with a chemical change in the substance and/or one or more substances associated with one of the adhesive films. Non-limiting examples of physical properties are: absorption, concentration, density, dielectric, ductility, fluidity, fluid flow, malleability, melt and/or softening point, permeability, solubility, specific heat, viscosity, shear, stress, recovery, elasticity, and melt flow index. Non-limiting examples of chemical properties are: composition, bond structure, chemical stability. More preferably, the first 106 and second 108 adhesive films substantially comprise substantially the same thermoplastic adhesive compositions.

Suitable thermoplastic adhesive compositions comprise homopolymers, copolymers or polymer alloy comprising one or more of polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in some embodiments, the thermoplastic adhesive composition comprises one of acrylonitrile butadiene styrene, acrylic (PMMA), celluloid, cellulose acetate, cyclo-olefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycarbonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitrile (SAN), and combinations thereof. Preferably, the thermoplastic adhesive comprising the first 106 and second 108 adhesive films comprise one or more of polyurethane, polyvinyl acetate, polyamide, polyacrylate and combinations thereof. In more preferred embodiments, the thermoplastic adhesive comprising the first 106 and second 108 adhesive films comprise polyurethanes or polyesters, while the third adhesive film 129 comprises one of polyolefin and/or polyester. Preferably, the third adhesive film 129 is polyolefin comprising one of polyethylene, polypropylene or a mixture thereof.

The self-supporting adhesive layer 105 has one or more of a modulus, a thickness and a recovery value. The modulus refers to the force required to pull at a specific sample gauge of a 25.4 mm wide sample, respectively, to 40% and 100%. The recovery refers to the percent of shape retained after being stretched at a rate of 304 mm per minute and allowed to retract freely for a single minute to 100% of its original length. The melt flow index refers to the rate of molten adhesive flow at 175 degrees Celsius under 2.17 kg load. Preferred modulus values for the self-supporting adhesive layer 105 are given in Table I. The recovery value for the self-supporting adhesive layer 105 is preferably at least about 75%, preferably at least about 90%. More preferably, the recovery value for the self-supporting adhesive layer 105 is at least about 95%, even more preferably at least about 99%. Preferred properties of the self-supporting adhesive layer 105 are provided in Table I below:

TABLE I

| Composition | A | B | C | D | E | F | G | H | I |
|---|---|---|---|---|---|---|---|---|---|
| Bi or Tri Layer | Bi | Bi | Bi | Bi | Bi | Bi | Bi | Tri | Tri |
| Thickness | 18 μm | 50 μm | 75 μm | 50 μm | 50 μm | 50 μm | 200 μm | 200 μm | 100 μm |
| @40% | 1.2N (0.3 lbs) | 7.6N (1.7 lbs) | 6.2N (1.4 lbs) | 4.5N (1.0 lbs) | 1.8N (0.4 lbs) | 3.6N (0.8 lbs) | 5.2N (1.2 lbs) | 19.6N (4.4 lbs) | 7.7N (1.7 lbs) |
| @100% | 1.6N (0.4 lbs) | 8.9N (2.0 lbs) | 8.96N (2.0 lbs) | 7.1N (1.6 lbs) | 3.6N (0.8 lbs) | 6.2N (1.4 lbs) | 7.2N (1.6 lbs) | 25.4N (5.7 lbs) | 10.2N (2.3 lbs) |

In some embodiments, the self-supporting adhesive layer 105, and each of its components, namely the first 106 and second 108 adhesive films and obstructive film 108, have a preferred modulus@40% elongation of from about 1 N to about 25N, even more preferably from about 2 to about 20N, and even more preferably from about 2 to about 10N and a preferred modulus@100% elongation of from about 1 N to about 50N, even more preferably from about 2 to about 25N, and even more preferably from about 2 to about 12.5N.

The first 106 and second 108 adhesive films, respectively, have one or more of melt flow index and softening point. The softening point refers to the temperature at which the adhesive becomes one or more of tacky, soft to the touch and/or pliable at a pressure. Commonly the softening point pressure for one or both of the first 106 and second 108 adhesive films is from about 1 psi to about 100 psi, more commonly the softening point pressure for one or both of the first 106 and second 108 adhesive films is from about 5 psi to about 50 psi, or even more commonly the softening point pressure for one or both of the first 106 and second 108 adhesive films is from about 10 psi to about 40 psi. Typically the softening pint temperature for one or both of the first 206 and second 108 adhesive films is from about 50 degrees Celsius to about 140 degrees Celsius, more typically the softening pint temperature for one or both of the first 206 and second 108 adhesive films is from about 60 degrees Celsius to about 100 degrees Celsius, or even more typically the softening pint temperature for one or both of the first 206 and second 108 adhesive films is from about 75 degrees Celsius to about 85 degrees Celsius. The melt flow index of the self-supporting adhesive layer 105 is measured at 175 degrees Celsius under a 2.16 kg mass. Commonly the melt flow index for first 106 and second 108 adhesive films is from about 5 dg/min to about 100 dg/min, more commonly the melt flow index for the first 106 and second 108 adhesive films is form about 5 dg/min to about 75 dg/min, even more commonly the melt flow index for the first 106 and second 108 adhesive films is from about 10 to about 60 dg/min, or yet even more commonly the melt flow index for the first 106 and second 108 adhesive films is from about 35 dg/min to about 50 dg/min.

In some embodiments, the second adhesive film 108 can be a low viscosity and low melt-point, fast-flowing penetrating adhesive. Preferably, the second adhesive film 108 can flow into the substrate 125 and intermingle with the substrate 125 while at the same time adhering to the obstructive film 107. Typically, the melting and softening points of the second adhesive film 108 is less than, even more preferably at least about 25 degrees Fahrenheit, and even more preferably at least about 50 degrees Fahrenheit less than the melting and softening points of the first adhesive film 106 and obstructive film 107. The melting and softening points of the obstructive film 107 are preferably greater, even more preferably at least about 25 degrees Fahrenheit, and even more preferably at least about 50 degrees Fahrenheit greater than the melting and softening points of either the first 106 or second 108 adhesive films. Typically, the melting and softening points of the obstructive film 107 is at least about 400 degrees Fahrenheit and even more typically at least about 410 degrees Fahrenheit.

The obstructive film 107 comprises a polymeric material. The polymeric material may be one of a thermoplastic material, a thermosetting material and a combination of thermoplastic and thermosetting polymeric materials. In some embodiments, the obstructive film 107 may have elastomeric properties and in other embodiments the obstructive film 107 may substantially lack elastomeric properties.

Preferably, the obstructive film 107 has elastomeric properties. The elastomeric properties of obstructive film 107 are substantially independent of any discontinuities that may exist within the obstructive film 107 and are due substantially to chemical and/or physical properties of materials comprising the obstructive film 107. Preferably, the obstructive film 107 is polymer having one of more of the following properties: at least some amorphous phases, a glass transition temperature less than ambient temperature, and viscoelastic and/or elastic physical properties. Furthermore, the elastomeric obstructive film 107 can comprise one of styrene-buatdiene rubber, polybutadinene, ethylene-propylene rubber, butyl and halobutyl rubber, nitrile rubber, hydrogenate nitrile rubber, acrylic elastomers (such as, but not limited to ACM, AEM and EEA), chlorinate polyethylene elastomers, chloroprene elastomers, chlorosulfonated polyethylene elastomers, epichlorohydrin elastomers, fluoroelastomers, fluorosilicone elastomers, polysulfide elastomers, silicone elastomers, urethane elastomers, vinyl acetate copolymer elastomers, spandex, nylon, or other suitable elastomeric materials and combinations thereof. More preferably, the obstructive film 107 is polyurethane.

When the obstructive film 107 substantially lacks elastomeric properties the obstructive film 107 can preferably comprise a high-integrity, high-tensile strength layer, which can provide dimensional stability. Preferably, the substantially inelastic obstructive film 107 is one or more of thin, light weight, and soft.

In some embodiments, the obstructive film 107 can be dyed or colored. Moreover, the obstructive film 107 can be optically opaque. As will be appreciated, optical opacity refers to a substance that substantially inhibits or blocks the passage of wavelength bands of light. Typically, the obstructive film 107 typically blocks the passage of at least about 50%, even more typically of at least about 75%, and even more typically at least about 90% of visible light wavelengths. The opacity inhibits the color of the textile substrate from impairing the appearance of the design and can be imparted by any technique, such as using a white (e.g., titanium dioxide) pigment or dye. The first adhesive film is preferably relatively thin (e.g., less than about 5 mm and even more preferably less than about 1 mm) and bonds aggressively to the media. In some embodiments, the first 106 and/or second 108 adhesive films have one or more physical properties similar to those of the obstructive film 107.

In some embodiments, the self-supporting adhesive layer 105 typically has a minimum thickness (total) of at least about 0.0010 inches, more typically the self-supporting adhesive layer 105 has a minimum thickness of at least than about 0.0025 inches, even more typically the self-supporting adhesive layer 105 has a minimum thickness of at least about 0.0050 inches, and yet even more typically the self-supporting adhesive layer 105 has a minimum thickness of at least about 0.0075 inches, and still yet even more typically the self-supporting adhesive layer 105 has a minimum thickness of at least about 0.0100 inches. Commonly the self-supporting adhesive layer has a maximum thickness of no more than about 0.0750 inches, even more typically a maximum film thickness of no more than about 0.0500 inches, even more typically a maximum film thickness of no more than about 0.0250 inches, and even more typically a maximum film thickness of no more than about 0.0100 inches and a minimum of at least about at least about 0.0010 inches, more typically a minimum thickness of at least about 0.0025 inches, even more typically a minimum thickness of at least about 0.0050 inches, and yet even more typically has a minimum thickness of at least about 0.0075 inches, and still yet even more typically a minimum thickness of at least about 0.0100 inches.

In other embodiments, the self-supporting adhesive layer 105 typically has a minimum thickness (total) of at least about 15 µm, more typically the self-supporting adhesive layer 105 has a minimum thickness of at least than about 20 µm, even more typically the self-supporting adhesive layer 105 has a minimum thickness of at least about 50 µm, and yet even more typically the self-supporting adhesive layer 105 has a minimum thickness of at least about 80 µm, still yet even more typically the self-supporting adhesive layer 105 has a minimum thickness of at least about 100 µm, still yet even more typically the self-supporting adhesive layer 105 has a minimum thickness of at least about 150 µm, or still yet even more typically the self-supporting adhesive layer 105 has a minimum thickness of at least about 200 µm. Commonly the self-supporting adhesive layer 105 has a maximum thickness of no more than about 210 µm, even more typically a maximum film thickness of no more than about 200 µm, even more typically a maximum film thickness of no more than about 150 µm, and even more typically a maximum film thickness of no more than about 105 µm and a minimum of at least about at least about 20 µm, more typically a minimum thickness of at least 50 µm, even more typically a minimum thickness of at least about 80 µm, and yet even more typically has a minimum thickness of at least about 150 µm, and still yet even more typically a minimum thickness of at least about 100 µm. The self-supporting adhesive layer 105 has maximum and minimum melt flow indexes.

In some embodiments, the first 106 and second 108 adhesives, respectively, have an adhesive film thickness. Commonly the adhesive thickness is about 25 µm, more commonly the adhesive thickness is about 50 µm, even more commonly the adhesive thickness is about 75 µm, yet even more commonly the adhesive thickness is about 125 µm, still yet even more commonly the adhesive thickness is about 250 µm, or still yet even more commonly the adhesive thickness is about 400 µm.

Typically the minimum melt follow index is least about 10 g/10 min, more typically the minimum melt follow index is least about 15 g/10 min, or even more typically the minimum melt follow index is least about 25 g/10 min, and typically the maximum melt flow index is no more than about 75 g/10 min, more typically the maximum melt flow index is no more than about 65 g/10 min, or even more typically the maximum melt flow index is no more than about 50 g/10 min.

In some embodiments, the second adhesive film 108 has a lower melt point and/or softening temperature than one or both of the first adhesive film 106 and the obstructive film 107. Furthermore, the obstructive film 107 has in some embodiments, a higher melt point and/or softening temperature than one or both of the first 106 and second 108 adhesive films. Moreover, the first adhesive film 106 has, in some embodiments, a higher melt point and/or softening temperature than the second adhesive film 108.

When the self-supporting adhesive layer 105 is a tri-layered adhesive, a preferred tri-layered, self-supporting adhesive layer 105 is a seam tape sold by Bemis Associates UK or Bemis Manufacturing Company under one or more of the following tradenames: ETEB3302™ or EB3302™, EB3304™, EB3106™, 3410™, 3914™, SRT3009™, ST306™ and ETEB3106™. While not wanting to be limited by example, the ETEB3302™ or EB3302™ seam tapes comprise a 3-layer polyurethane, which has a softening and melting temperature of the obstructive (elastomeric) film 107 typically above about 350 degrees Fahrenheit and even more typically above about 400 degrees Fahrenheit and softening and melting temperatures of the first 106 and second 108 adhesive films preferably of no more than about 350 degrees Fahrenheit, more preferably of no more than about 300 degrees Fahrenheit, and even more preferably of no more than about 275 degrees Fahrenheit; a preferred glue line temperature of from about 100 to about 150 degrees Celsius and an even more preferred glue line temperature of from about 120 to about 130 degrees Celsius for a flat press; and a preferred glue line temperature of from about 200 to about 300 degree Celsius and an even more preferred glue line temperature of from about 200 to about 250 degree Celsius for a continuous bonding machine. Regarding the EB3304™ seam tape, the EB3304™ tape (while not wanting to be bound by example) comprise a 3-layer polyurethane, which has softening and/or melting temperatures of the obstructive elastomeric film 107 typically above about 300 degrees Fahrenheit and even more typically above about 350 degrees Fahrenheit and softening and/or melting temperatures of the first 106 and second 108 adhesive films preferably of no more than about 300 degrees Fahrenheit, more preferably of no more than about 275 degrees Fahrenheit, and even more preferably of no more than about 265 degrees Fahrenheit; a preferred glue line temperature of from about 100 to about 150 degrees Celsius and an even more preferred glue line temperature of from about 120 to about 130 degrees Celsius for a flat press; and a preferred glue line temperature of from about 200 to about 300 degrees Celsius and an even more preferred glue line temperature of from about 200 to about 250 degrees Celsius for a continuous bonding machine. While not wanting to be bound by an example, the EB3106™ seam tape comprises a 3-layer polyurethane, which has a softening and melting temperature of the elastomeric film typically above about 300 degrees Fahrenheit and even more typically above about 350 degrees Fahrenheit and a softening and melting temperature of the first 106 and second 108 adhesive films preferably of no more than about 300 degrees Fahrenheit, more preferably of no more than about 275 degrees Fahrenheit, and even more preferably of no more than about 265 degrees Fahrenheit; a preferred glue line temperature of from about 100 to about 250 degree Celsius and an even more preferred glue line temperature of from about 160 to about 190 degrees Celsius for a flat press; and a preferred glue line temperature of from about 200 to about 300 degrees Celsius and an even more preferred glue line temperature of from about 200 to about 250 degrees Celsius for a continuous bonding machine. Regarding the 3410™ seam tape, the seam tape comprises, without limitation by example, a urethane tape having a modulus in the range of about 54 gm to about 66 gm, with about 60 gm being preferred, and a softening point of about 120 degrees Celsius. While not wanting to be limited by example the 3914™ seam tape typically has softening and/or melting temperatures of the obstructive, elastomeric film 107 above about 350 degrees Fahrenheit and even more typically above about 400 degrees Fahrenheit and softening and/or melting temperatures of the first 106 and second 108 adhesive films preferably of no more than about 375 degrees Fahrenheit, more preferably of no more than about 350 degrees Fahrenheit and even more preferably of no more than about 330 degrees Fahrenheit. The SRT3009™, ST306™ and ETEB3106™ seam tapes, respectively comprise a nylon tricot/polyurethane barrier/polyurethane tape, a polyurethane/polyurethane/nylon triocot tape, and a 3-layer polyurethane tape.

Preferred properties of the self-supporting adhesive layer 105 are provided in Tables II and III below:

TABLE II

| | Layer | Total Film Thickness | Obstructive Layer Thickness | Adhesive Film Thickness | Adhesive Softening Point | Adhesive Melt Flow Index | Modulus | Glue Line Temperature |
|---|---|---|---|---|---|---|---|---|
| 3914 | Tri-Layer | 102 µm | | 51 µm | 95° C. | 45 dg/min | 8.4N | 110° C. to 165° C. |
| EB3304 | Tri-Layer | 150 µm | Polyurethane 75 µm | | 90° C. | | 16.0N | 93° C. to 110° C. |
| EB3106 | Tri-Layer | 203 µm | | | 75° C. | 50 dg/min | 25.4N | 120° C. to 130° C. |
| EB3302 | | 101 µm | Polyurethane 50 µm | 50 µm | 83° C. | 45 dg/min | 10.2N | 120° C. to 130° C. |

TABLE III

| | Flat Press | | | Continuous Bonding Machine | | | Foot and Plate Continuous Bonding | | |
|---|---|---|---|---|---|---|---|---|---|
| | Machine Setting Temp | Dwell Time | Pressure | Machine Setting Temp | Machine Speed | Pressure | Foot & Plate Temp | Speed | Roller Pressure |
| 3914 | 115° C.-170° C. | 15-25 seconds | 2.8-4.2 Bar | 150° C.-200° C. | 1.75 m/min | 1 Bar | 225° C.-325° C. | 1.0-1.5 m/min | 2.0 Bar |
| EB3304 | 120° C.-130° C. | 15-25 seconds | 2.8-4.2 Bar | 200° C.-250° C. | 1.5-2.0 m/min | 1 Bar | | | |
| EB3106 | 160° C.-190° C. | 20-30 seconds | 2.8-4.2 Bar | 200° C.-250° C. | 1.5-2.0 m/min | 1 Bar | | | |
| EB3302 | 120° C.-130° C. | 15-25 seconds | 2.8-4.2 Bar | 200° C.-250° C. | 1.5-2.0 m/min | 1 Bar | | | |

In some embodiments, the three-layer self-supporting adhesive layer 105 can comprise a polyester first adhesive film 106, a polyurethane obstructive film 107, and a polyester second adhesive film 108. The obstructive film 107 can have higher softening and/or melting temperatures than the first 106 and second 108 adhesive films. When melted and/or softened, the first 106 and second 108 adhesive films can have lower viscosities than the obstructive film 107. Preferably, the first 106 and second 108 adhesive films are substantially devoid of polyurethane. Furthermore, the obstructive film 107, preferably, comprises an elastomeric polyurethane film.

When the self-supporting adhesive layer 105 is a bi-layered adhesive, a preferred bi-layered, self-supporting adhesive layer 105 is a seam tape sold by Bemis Associates UK or Bemis Manufacturing Company under one or more of the following tradenames: SRT 1010™, ST-104™, ST-503™, ST-504™ and ST-604™. While not wanting to be limited by example the SRT 1010™ comprises a polyurethane adhesive/nylon fabric. The ST-104™, ST-503™, ST-504™ and ST-604™ seam tapes each, respectively, comprise two polyurethane layers.

Figure 2:
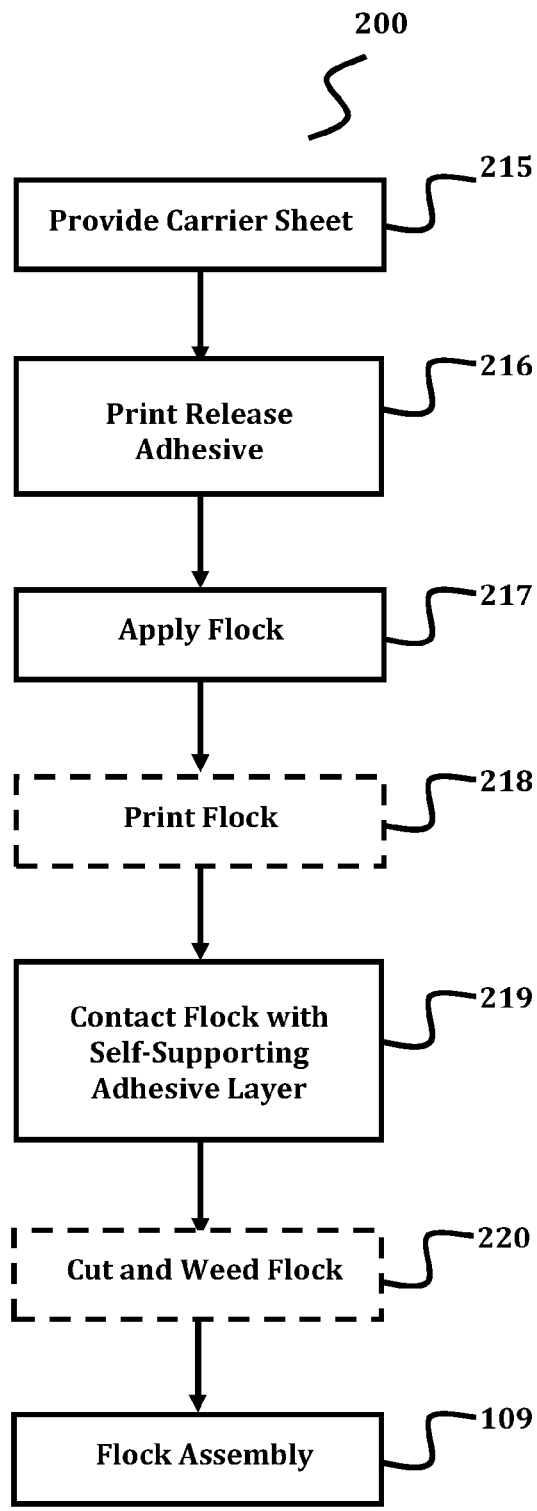
FIG. 2 depicts a first process for making the flocked product depicted in FIG. 1 according to an embodiment.

FIG. 2 depicts a first process 200 for making the flocked product 109, more specifically FIG. 2 depicts a process for making a flock transfer according to some of the embodiments.

In step 215, the first carrier sheet 100 is provided. In step 216, the release adhesive 101 is applied to the first carrier sheet 100. The release adhesive 101 is applied to the first carrier sheet 100 by any process well known to those of ordinary skill within the art. Preferably, the release adhesive 101 is applied to the first carrier sheet 100 by a printing process, more preferably by a screen-printing process. The screen-printing process prints the release adhesive 101 on the carrier sheet in a desired pattern.

In step 217, a plurality of flock fibers 102 is applied to release adhesive 101. Preferably, the plurality of flock fibers 102 is applied to the release adhesive 101 by an electrostatic deposition process. The process for adhering flock to a release adhesive positioned on a carrier sheet is described in U.S. Pat. Nos. 4,810,549; 5,207,851; 6,110,560; 7,344,769; and 7,364,782 all to Abrams, each of which is incorporated in its entirety herein by this reference. Moreover, the flock 102 may be colorable by sublimation printing techniques. Exemplary flock fiber compositions include polyester, nylon, and poly (ethene-co-styrene) (PES), though other compositions may be employed. Preferred flock compositions are discussed in U.S. Pat. Nos. 7,413,581 and 7,393,576, each of which is incorporated herein by this reference.

In optional step 218, the plurality of flock fibers 102 may be dyed; preferably, by a sublimation dye transfer process. Suitable sublimation dye transfer processes are described in U.S. Pat. No. 7,413,581, which is incorporated in its entirety herein by this reference.

In step 219, the plurality of flock fibers 102 is contacted with the self-supporting adhesive layer 105 to form an intermediate product. More specifically, the plurality of flock fibers 102 is contacted with the first adhesive film 106 of the self-supporting adhesive layer 105. Even more specifically, the first fiber ends 103 are in contact with and/or embedded the first adhesive film 106 as described above and in accordance with various embodiments. The second fiber ends 104 are in contact with the release adhesive 101.

In some embodiments, step 219 further includes contacting the self-supporting layer 105 with the rigid layer 127. The second adhesive film 108 is contacted with the rigid, inelastic film 128. In some embodiments, the rigid layer 127 is contacted with the self-supporting adhesive layer 105 after one or more of optional step 218 and adhering and/or embedding of the flock fibers 102 in the first adhesive film 106. In other embodiments, the rigid layer 127 is contacted with the self-supporting adhesive layer 105 before one or more of optional step 218 and adhering and/or embedding of the flock fibers 102 in the first adhesive film 106. And, in yet other embodiments, the rigid layer 127 and the self-supporting adhesive layer 105 are contacted substantially at about the same time as one or more of optional step 218 and adhering and/or embedding of the flock fibers 102 in the first adhesive film 106.

Preferably, the contacting step 219 includes, before, after, or substantially at about the same time as, applying one or both of heat and pressure. One or both of the heat and pressure substantially embeds the first fiber ends 103 into the first adhesive film 106. Heat is applied to at least one of the first carrier sheet 100 and the self-supporting, adhesive layer 105. Preferably, substantially enough heat is applied to at least soften, if not at least partially melt, the first adhesive film 106. While not wanting to be bound by any theory, it is believed that the embedding of the first fiber ends 103 into the first adhesive film 106 substantially adhesive bonds the flock fibers to the first adhesive film 106 by one or more of the following adhesive processes: mechanical, electrostatic, adsorption, chemisorption, diffusion, or a combination thereof. Preferably, the first fiber ends 103 are adhered to the first adhesive film 106 by at least some, if not mostly, a mechanic adhesive process.

In some embodiments, the first adhesive film 106 softens and/or fully or partially melts at a first adhesive film temperature as described above for the various adhesive films and/or adhesive layers. Preferably, the first adhesive film temperature is from about 50 degrees Celsius to about 140 degrees Celsius. Preferably, the first adhesive film temperature is from about 60 degrees Celsius to about 120 degrees Celsius. More preferably, the first adhesive film softens and/or fully or partially melts at the first adhesive film temperature of from about 65 degrees Celsius to about 100 degrees Celsius. Even more preferably, the first adhesive film softens and/or fully or partially melts at the first adhesive film temperature from about 75 degrees Celsius to about 85 degrees Celsius. Stated another way, a process line temperature from about 100 degrees Celsius to about 300 degrees Celsius may provide sufficient heat to sufficiently soften and/or partially melt the first adhesive film 106. Preferably, the process line temperature is from about 175 degrees Celsius to about 275 degrees Celsius. More preferably, the process line temperature to at least sufficiently soften and/or partially melt the first adhesive film 106 is from about 200 degrees Celsius to about 250 degrees Celsius. A process line temperature means the temperature applied during at least the applying of heat.

The pressure applied to one of adhere and/or embed the flock fibers as described above in the first adhesive film 106 is preferably from about 0.1 bar to about 10 bar, more preferably from about 0.5 bar to about 5 bar, and even more preferably from about 0.7 to about 4.5 bar, and even more preferably, from about 0.7 bar to about 4.0 bar.

In optional step 220, the intermediate product is cut and the flock fibers are weeded from the cut intermediate product. The cutting process may be any suitable cutting device known to a person of ordinary skill within the art, such as a steel-rule dies, hard tool metal dies, laser cutter, ultrasound cutter, high frequency cutter, hot-wire cutter, or water jet cutter. The weeding process may be by any suitable process known to one of ordinary skill within the art, such as manual, mechanical, or vacuum removal of unwanted portions. Preferably, the cut portions being retained form a flock transfer 130. The flock transfer 130 comprises the plurality of flock fiber 102 positioned between the self-supporting adhesive layer 105 and the release adhesive 101. More preferably, the retained portions are associated with at least one of the first carrier sheet 100 and self-supporting adhesive layer 105.

Optional steps 218 and 220 may be performed in any order with respect to step 219. While not wanting to be limited by example, steps 218, 219 and 220 may be performed in one of the following sequences (presented in order of first to third): a) 218, 219, 220; b) 219, 218, 220; c) 220, 218, 219; d) 220, 219, 218; e) 218, 220, 219; or f) 219, 220, 218. Furthermore, steps 218 and 220 may be preformed substantially simultaneously, that is, the heat and pressure applied during sublimation printing may be sufficient to substantially embed the first fiber ends 103 into the first adhesive film 106.

Figure 3:
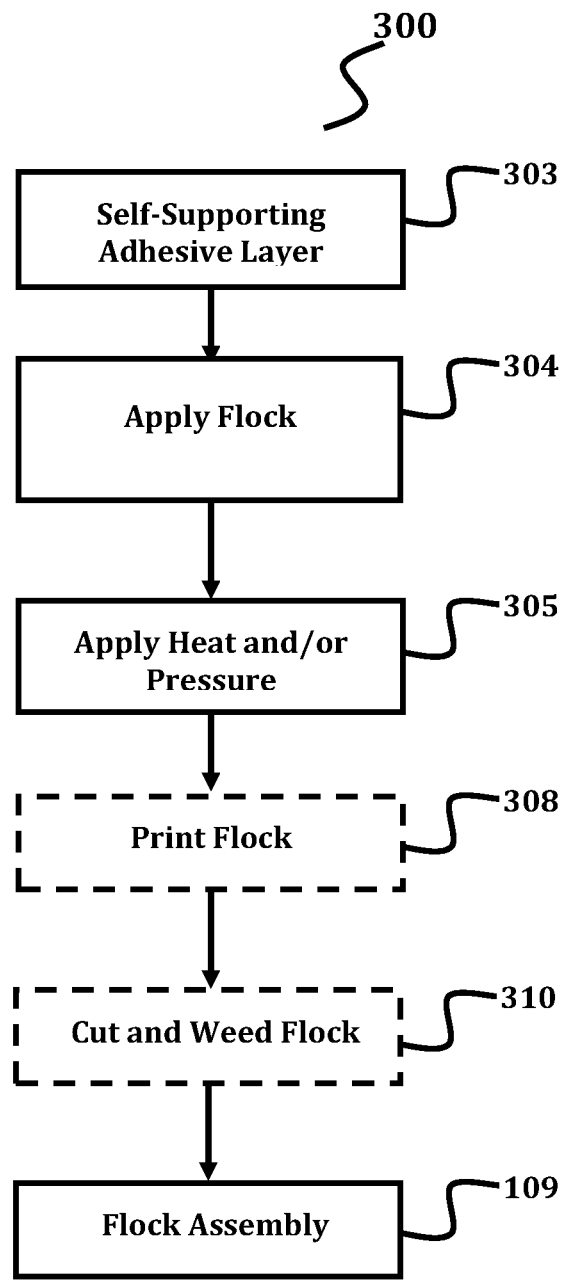
FIG. 3 depicts a second process for making the flocked product depicted in FIG. 1 according to another embodiment.

FIG. 3 depicts a second process 300 for making the flocked product 109, more specifically FIG. 3 depicts a process for making a flock transfer according to some of the embodiments.

In step 303, the self-supporting adhesive layer 105 is provided. Preferably, the self-supporting adhesive layer 105 has the optional second carrier sheet 121. Preferably, the second carrier sheet 121 is reversibly adhered to the second adhesive film 108. In some embodiments, the self-supporting layer 105 is provided with the second adhesive film 106 in contact with and substantially adhered to the opaque layer 128 of the rigid layer 127.

In step 304, the plurality of flock fibers 102 are contacted with the first adhesive film 106. Preferably, the contacting of the plurality of flock fibers 102 is an electrostatic flock deposition and/or printing process. The electrostatic flock process is described in U.S. Pat. Nos. 4,810,549; 5,207,851; 6,110,560; 7,344,769; and 7,364,782, each of which is incorporated in its entirety herein by this reference.

In step 305, one or both of heat and pressure are applied to at least one of the plurality of flock fibers 102 and the self-supporting adhesive layer 105. One or both of the heat and pressure substantially adheres and/or embeds the first fiber ends 103 into the first adhesive film 106 as described above and in accordance with various embodiments to form the flocked product 109.

Preferably, substantially enough heat is applied to at least soften, if not at least partially melt, the first adhesive film 106. As described above, the heat and pressure may be applied substantially during and/or after contacting step 304. It can be appreciated that, the self-supporting adhesive layer 105 may be pre-heated prior to contacting step 304 and/or the applying of pressure. The degree of heat and/or pressure applied one or both of the plurality of flock fibers 102 and the first adhesive film 106 to adhere and/or embed the first fiber ends 103 into the first adhesive film 106 is as described above and in accordance with various embodiments. More specifically, in some embodiments, the first adhesive film 106 softens and/or fully or partially melts at a first adhesive film temperature as described above for the various adhesive films and/or adhesive layers. Preferably, the first adhesive film temperature is from about 50 degrees Celsius to about 140 degrees Celsius. Preferably, the first adhesive film temperature is from about 60 degrees Celsius to about 120 degrees Celsius. More preferably, the first adhesive film softens and/or fully or partially melts at the first adhesive film temperature of from about 65 degrees Celsius to about 100 degrees Celsius. Even more preferably, the first adhesive film softens and/or fully or partially melts at the first adhesive film temperature from about 75 degrees Celsius to about 85 degrees Celsius. Stated another way, a process line temperature from about 100 degrees Celsius to about 300 degrees Celsius may provide sufficient heat to sufficiently soften and/or partially melt the first adhesive film 106. Preferably, the process line temperature is from about 175 degrees Celsius to about 275 degrees Celsius. More preferably, the process line temperature to at least sufficiently soften and/or partially melt the first adhesive film 106 is from about 200 degrees Celsius to about 250 degrees Celsius. A process line temperature means the temperature applied during at least the applying of heat. Furthermore, the pressure applied to one of adhere and/or embed the flock fibers as described above in the first adhesive film 106 is preferably from about 0.1 bar to about 10 bar, more preferably from about 0.5 bar to about 5 bar, and even more preferably from about 0.7 to about 4.5 bar, and even more preferably, from about 0.7 bar to about 4.0 bar.

The second process 300 may optionally include the sublimation dying 308 and cutting/weeding 310 steps as described above for process 200. Furthermore, optional steps 308 and 310 may be carried-out in any sequence with respect to steps 300 and/or 305 as presented above for process 200. Moreover, steps 308 and 305 may be preformed substantially simultaneously, that is, the heat and pressure applied during sublimation printing may be sufficient to substantially adhere and/or embed as described above the first fiber ends 103 into the first adhesive film 106.

Figure 4A:
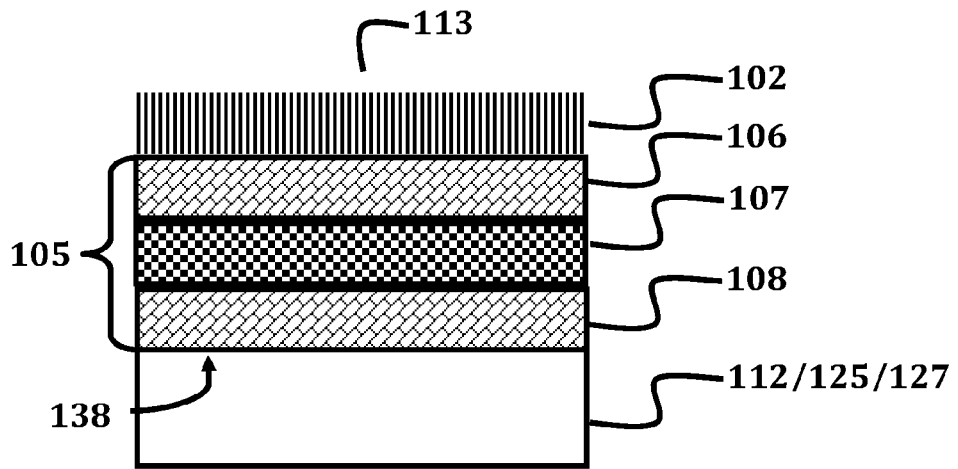
FIGS. 4A-4C are cross-sectional views of flocked products according to various embodiments.
Figure 4B:
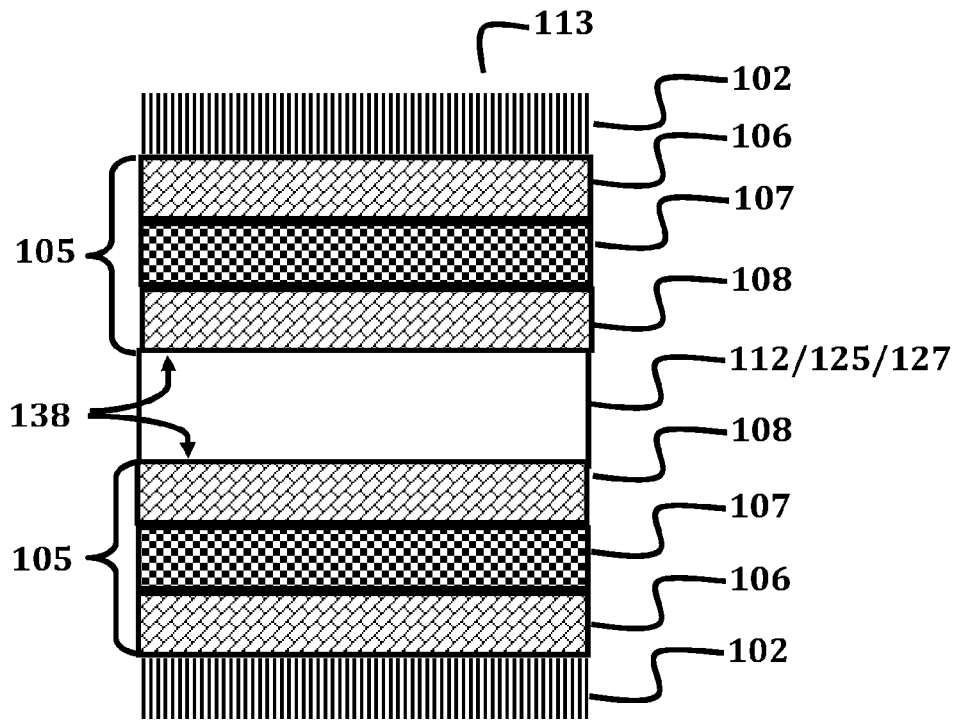
Figure 4C:
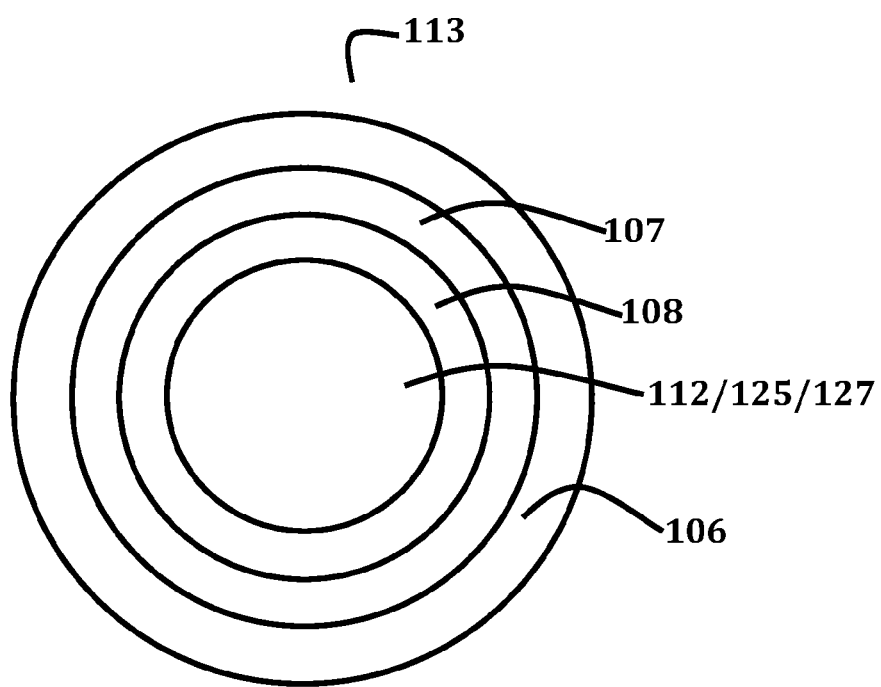

FIGS. 4A-4C depict, non-limiting cross-sectional views of flocked articles according to various embodiments, more specifically FIGS. 4A-4C depict a flocked product 113 comprising a plurality of flock fibers adhered to a substrate 125 by a second adhesive film 108 or third adhesive film 129. Each of the various forms of the flock article 113 comprises a substrate 125 having flock fibers 102 adhered to the substrate 125 by the self-supporting adhesive layer 105 or the optional rigid layer 127. The flock fibers comprising the plurality of flock fibers 102 are orientated substantially perpendicular to the self-supporting adhesive layer 105. The first fiber ends 103 are adhered and/or embedded in the first adhesive film 106 of the self-supporting adhesive layer 105 as described above in accordance with various embodiments. One of the second 108 and third 129 adhesive films is in contact with and/or adhered to the substrate 125, or more specifically to a substrate surface 138. The obstructive film 107 is positioned between the first 106 and second 108 adhesive films. For the embodiments having the optional rigid layer 127, the self-supporting adhesive layer 105 is positioned between the flock fibers 102 and the rigid layer 127, the substrate 125 is adhered to the plurality of flock fibers 102 by the third adhesive film 129 and the rigid layer 127 is adhered to the self-supporting adhesive layer 105 by the second adhesive film 108.

The flocked article 113 depicted in FIG. 4B comprises the substrate 125 having a plurality of substrate surfaces 138 with the flock fibers 102 adhered to at least two of the plurality of substrate surfaces 138 by one of the second 108 or third 129 adhesive films positioned on the at least two of the plurality of the substrate surfaces 138. While FIG. 4B depicts the plurality of substrate surfaces 138 having flock fibers adhered thereto in an opposing relationship, it can be appreciated that the plurality of substrate surfaces having flock fibers adhered thereto may be in any relationship (such as, but not limited to, opposing perpendicular, obtuse, oblique, or other geometric relationship to each other).

Figure 5:
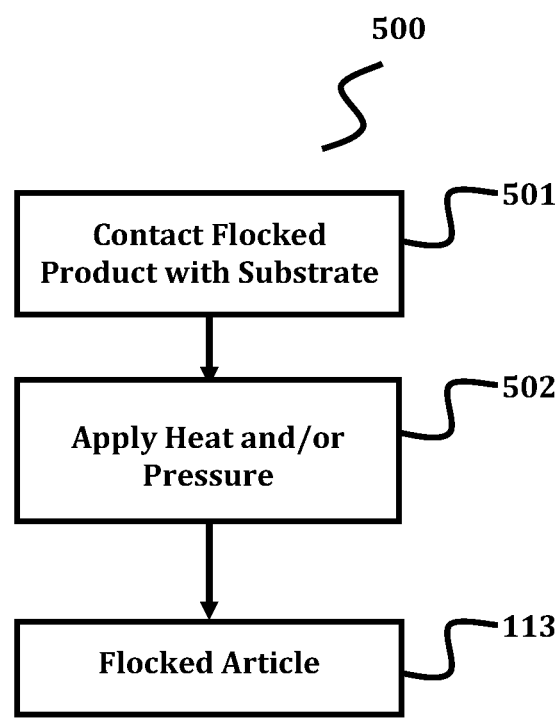
FIG. 5 depicts a process for making some of the flocked articles depicted in FIGS. 4A-4C according to an embodiment.

FIG. 5 depicts process 500 for making the flocked article according to various embodiments, such as, but not limited to a process for making the flocked article 113.

In step 501, one of the second 108 or third 129 adhesive films of the flocked product 109, as described above in accordance with various embodiments, is contacted with one of the single substrate surface 138 or two or more of the plurality of the substrate surfaces 138. Preferably, one of the second 108 or third 129 adhesive films of the flocked product 109 is contacted in registration with the substrate 125. The registration process may be a mechanical and/or electro-optical guided registration process. The flocked product 109 may optionally contain the second carrier sheet 121. If the flocked product 109 contains the second carrier sheet 121, the second carrier sheet 121 may be removed prior to contacting one of the second 108 or third 129 adhesive films with the substrate 125.

In step 502, one or both of heat and pressure are applied to at least one of the substrate 125 and the flocked product 109 to form the flocked article 113. Preferably, substantially enough heat is applied to at least soften, if not at least partially melt, one of the second 108 or third 129 adhesive films, as described in accordance with various embodiments.

While not wanting to be bound by any theory, it is believed that the for one of the second 108 or third 129 adhesive films to substantially and/or permanently adhere to the substrate 125, the respective adhesive should be sufficiently softened and/or partially melted to at least flow and/or wet the substrate 125. Furthermore, it is believed the flowing and/or wetting of the substrate 125 by the softened and/or partially melted adhesive substantially, permanently binds one of the second 108 or third 129 adhesive films to the substrate 125 by one or more of the following adhesion processes: mechanical, electrostatic, adsorption, chemisorption, diffusion, or a combination thereof. Preferably, one of the second 108 or third 129 adhesive films is permanently adhered to the substrate 125 by at least some, if not mostly, a mechanical adhesive process.

To maintain a sufficiently strong bond between one of the second 108 and third 129 adhesive films and the substrate 125 without too much penetration of the adhesive into the substrate 125, platen pressure can be important. For a Hix™ brand pneumatic lamination machine, the preferred line pressure setting is at least about 50 psi, even more preferably from about 50 to about 75 psi, and even more preferably from about 50 to about 60 psi. The line pressure is a relative number and must be converted to direct applied pressure or "surface" pressure of the platen according to a formula known to those of ordinary skill in the art. The formula combines the line pressure, area of the heat press, and cylinder diameter and stroke of the machine. After the conversion, the direct surface applied pressure is preferably at least about 6 psi, even more preferably ranges from about 6 psi to about 15 psi, and even more preferably from about 6 psi to about 7.5 psi. The preferred residence or dwell time of a given segment of the elastomeric adhesive layer at these pressures preferably ranges from about 5 to about 50 seconds, even more preferably from about 7.5 to about 35 seconds, and even more preferably from about 10 to about 30 seconds.

If the flocked product 109 is provided with the flock fibers partially, but not substantially adhered to the first adhesive film 106, step 502 further includes applying one or both of sufficient heat and/or pressure to substantially adhere and/or embed the flock fibers in the first adhesive film 106. More specifically, one or both of heat and pressure are applied to the first adhesive film 106 to soften and/or fully or partially melt the first adhesive film at a first adhesive film temperature as described above for the various adhesive films and/or adhesive layers. Preferably, the first adhesive film temperature is from about 50 degrees Celsius to about 140 degrees Celsius. Preferably, the first adhesive film temperature is from about 60 degrees Celsius to about 120 degrees Celsius. More preferably, the first adhesive film softens and/or fully or partially melts at the first adhesive film temperature of from about 65 degrees Celsius to about 100 degrees Celsius. Even more preferably, the first adhesive film softens and/or fully or partially melts at the first adhesive film temperature from about 75 degrees Celsius to about 85 degrees Celsius. Stated another way, a process line temperature from about 100 degrees Celsius to about 300 degrees Celsius may provide sufficient heat to sufficiently soften and/or partially melt the first adhesive film 106. Preferably, the process line temperature is from about 175 degrees Celsius to about 275 degrees Celsius. More preferably, the process line temperature to at least sufficiently soften and/or partially melt the first adhesive film 106 is from about 200 degrees Celsius to about 250 degrees Celsius. A process line temperature means the temperature applied during at least the applying of heat. Furthermore, the pressure applied to one of adhere and/or embed the flock fibers as described above in the first adhesive film 106 is preferably from about 0.1 bar to about 10 bar, more preferably from about 0.5 bar to about 5 bar, and even more preferably from about 0.7 to about 4.5 bar, and even more preferably, from about 0.7 bar to about 4.0 bar.

The steps 501 and 502 may be one before the other or conducted substantially at about the same time. In another embodiment, at least one of the substrate 125 and/or one of second 108 or third 129 adhesive films (of the flocked product 109) may be heated prior to the contacting step 501. In yet another embodiment, the contacting step 501 may be preformed prior to applying one or both of heat and pressure. In still yet another embodiment, one of the second 108 or third 129 adhesive films may be heated and contacted with the substrate 125 prior to the application of pressure. One of skill in the art would appreciate that other combinations of contacting and applying heat and/or pressure are possible for adhering one of the second 108 or third 129 adhesive films to the substrate 125.

Step 501 may optionally include a sublimation printing process. In another configuration, a sublimation printing step may be conducted prior to or after the applying of heat and/or pressure in step 502.

Figure 6:
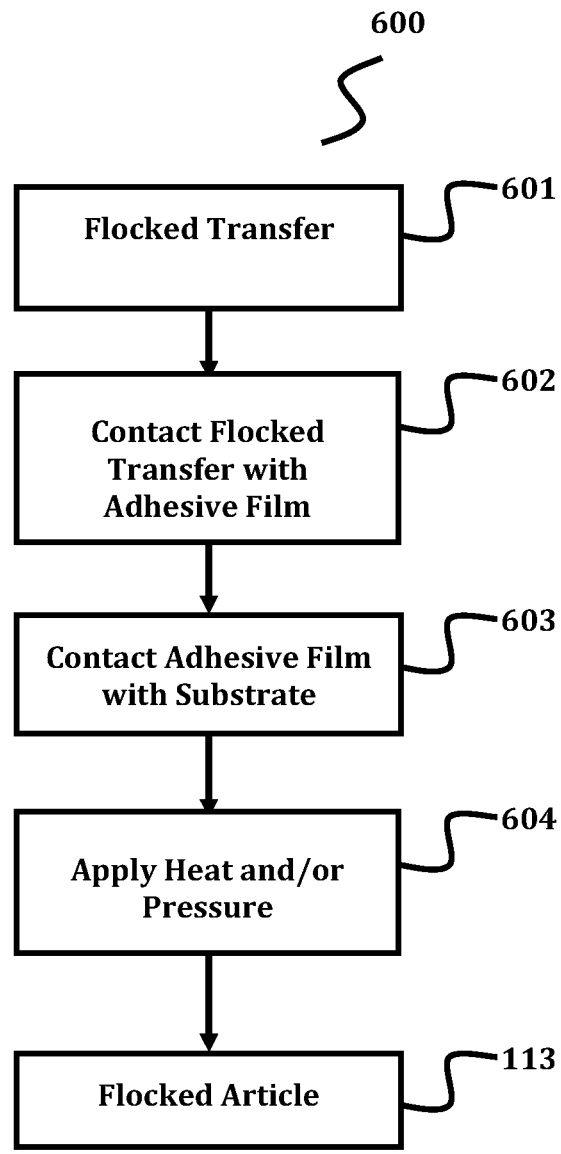
FIG. 6 depicts another process for making some of the flocked articles depicted in FIGS. 4A-4C according to another embodiment.

FIG. 6 depicts another process 600 for making a flocked article in accordance with various embodiments, such as but not limited to making the flocked article 113.

In step 601, the flock product 109, according to various embodiments, is provided. More specifically, the flocked product 109 comprises a plurality of flock fibers 102 adhered to a first carrier sheet 100 by a release adhesive 101. The flock fibers 102 have opposing first 103 and second 104 fiber ends. The second fiber ends 104 are adhered to the first carrier sheet 100 by the release adhesive 101.

In step 602, the first fiber ends 103 are contacted with a first adhesive film 106 of a self-supporting adhesive layer 105, the self-supporting adhesive layer 105 having an obstructive film 107 positioned between the first adhesive film 106 and a second adhesive film 108. The second adhesive film 108 may have an optional second carrier sheet 121 attached thereto.

In step 603, the second adhesive film 108 is contacted with the substrate 125. Preferably, the self-supporting, elastomeric layer 105 is pre-cut to correspond to one or both of the shape and size of the flocked product 109. It can be appreciated that, when the self-supporting adhesive layer 105 includes the optional second carrier sheet 121, the optional second carrier sheet 121 is removed prior to contacting the second adhesive film 108 with the substrate 125. Step 603 may optionally further include positioning an rigid layer 127 between the second adhesive film 108 and the substrate 125 and contacting the third adhesive film 129 with the substrate 125 and the rigid, inelastic film 128 with the second adhesive film 108.

In a preferred embodiment, at least one, or optionally both, the contacting steps 602 and 603 include a registration process, where the substrate 125 is contacted in registration with one or both of rigid layer 127 and the second adhesive film 108. The registration may be a mechanical and/or electrooptical guided registration process.

In step 604, one or both of heat and pressure are applied as described above to at least one of the flocked product 109 and the substrate 125 to form flocked article 113.

Preferably, substantially enough heat is applied to at least soften, if not at least partially melt, one the second 108 or third 129 adhesive films. While not wanting to be bound by any theory, it is believed that for the adhesive film to adhere to the substrate 125, the adhesive film should be sufficiently softened and/or partially melted to at least flow and/or wet the substrate 125. It is believed the flowing and/or wetting of the substrate 125 by the softened and/or partially melted adhesive film substantially adheres the one of the second 108 or third 129 adhesive films to the substrate 125. It is further believed the adhesive film is adhered to the substrate 125 by one or more of the following adhesion processes: mechanical, electrostatic, adsorption, chemisorption, diffusion, or a combination thereof. Preferably, the adhesive film is adhered to the substrate 125 by at least some, if not mostly, by a mechanical adhesive process.

If the flocked product 109 is provided with the flock fibers partially, but not substantially adhered to the first adhesive film 106, step 604 further includes applying one or both of sufficient heat and/or pressure to substantially adhere and/or embed the flock fibers in the first adhesive film 106. More specifically, one or both of heat and pressure are applied to the first adhesive film 106 to soften and/or fully or partially melt the first adhesive film at a first adhesive film temperature as described above for the various adhesive films and/or adhesive layers. Preferably, the first adhesive film temperature is from about 50 degrees Celsius to about 140 degrees Celsius. Preferably, the first adhesive film temperature is from about 60 degrees Celsius to about 120 degrees Celsius. More preferably, the first adhesive film softens and/or fully or partially melts at the first adhesive film temperature of from about 65 degrees Celsius to about 100 degrees Celsius. Even more preferably, the first adhesive film softens and/or fully or partially melts at the first adhesive film temperature from about 75 degrees Celsius to about 85 degrees Celsius. Stated another way, a process line temperature from about 100 degrees Celsius to about 300 degrees Celsius may provide sufficient heat to sufficiently soften and/or partially melt the first adhesive film 106. Preferably, the process line temperature is from about 175 degrees Celsius to about 275 degrees Celsius. More preferably, the process line temperature to at least sufficiently soften and/or partially melt the first adhesive film 106 is from about 200 degrees Celsius to about 250 degrees Celsius. A process line temperature means the temperature applied during at least the applying of heat. Furthermore, the pressure applied to one of adhere and/or embed the flock fibers as described above in the first adhesive film 106 is preferably from about 0.1 bar to about 10 bar, more preferably from about 0.5 bar to about 5 bar, and even more preferably from about 0.7 to about 4.5 bar, and even more preferably, from about 0.7 bar to about 4.0 bar.

In one embodiment, at least one of the substrate 125 and/or one of the second 108 or third 129 adhesive films may be heated prior to the contacting step 603. In yet another embodiment, the contacting step 603 may be preformed prior to applying one or both of heat and pressure. In still yet another embodiment, one of the second 108 or third 129 adhesive films may be heated and contacted with the substrate prior to the application of pressure.

In another embodiment, the second adhesive film 108 of the self-supporting adhesive layer 105 is contacted and/or adhered to one of the substrate 125 or opaque adhesive film 129 prior to the contacting of first fiber ends 103 with the first adhesive film 106. The optional second carrier sheet 121 may be adhered to the first adhesive film 106 during the contacting of one of the second 108 or third 129 adhesive films with the substrate 125. It can be appreciated that, the optional second carrier sheet 121 is removed prior to the contacting of the first fiber ends 103 with the first adhesive film 106.

Step 604 may optionally include a sublimation printing process. In another configuration the sublimation printing step may be conducted prior to or after the applying of heat and/or pressure step 604.

In an optional embodiment, flock fibers 102 adhered and/or embedded by an electrostatic deposition process after contacting one of the self-supporting, adhesive layer 105 or opaque adhesive film 129 with the substrate 125. The self-supporting adhesive layer 105 or the opaque adhesive film 129 may be adhered to the substrate 125 by the application of one or both heat and pressure prior to the electrostatic deposition of the flock fibers 102.

FIGS. 7-10 depict a first flocking system 150 according to an embodiment for manufacturing the flocked product 109 according to various embodiments. The first flocking system 150 includes a first roll 151 containing the self-supporting adhesive layer 105 with or without the opaque adhesive film 129 attached thereto and an optional second roll 152 containing the optional second carrier film 121. As can be appreciated, the optional second roll 152 containing the optional second carrier film 121 is omitted in certain applications. In one configuration the self-supporting adhesive layer 105 with or without the opaque adhesive film 129 attached to the self-supporting adhesive layer 105 contains the second carrier film 121. In another configuration, the self-supporting adhesive layer 105 with or without the opaque adhesive layer 129 attached thereto and/or second carrier film 121 are contacted one on top of the other to form a composite adhesive film 159 on a continuous running web line 153.

The composite adhesive film 159 is subjected to a flocking process in a flocking device 154 to form a flocked film 155. In a preferred embodiment, the flocking device 154 is an electrostatic flocking device. In the electrostatic process, different colors of flock (or fibers) are typically applied through separate screens or a single color flock is applied and later sublimation printed to form the multi-colored design. In multi-color flocking, the screens have a distribution of openings consistent with the desired locations of the respective colors of flock fibers. Other techniques in which the flock is mounted in a desired position and in such a way as to hold or entrap the flock after curing, may also be employed in either the direct or transfer flocking process configurations. Such techniques include vibration, gravity, and spraying of the flock onto the self-supporting adhesive layer 105.

Figure 7:
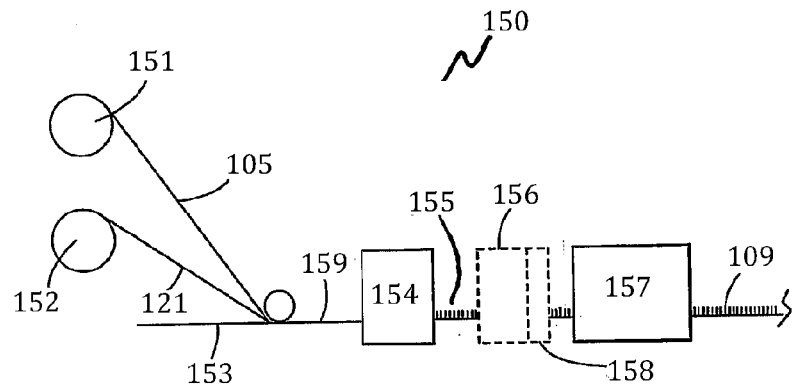
FIG. 7 shows a process configuration according to an embodiment.

Cutting 156 and weeding 158 devices are located between the flocking device 154 and heating and/or pressurizing device 157 in the first flocking system 150 depicted in FIG. 7. The cutting device 156 cuts a flocked surface into desired shapes as discussed below while the weeding device 158 peels off or removes unwanted portions of the flocked surface before applying heat and/or pressure. The cutting device 156 may be any suitable cutting device known to a person of ordinary skill within the art, such as a steel-rule die, hard tool metal die, laser cutter, ultrasound cutter, high frequency cutter, hot-wire cutter, or water jet cutter.

Figure 10:
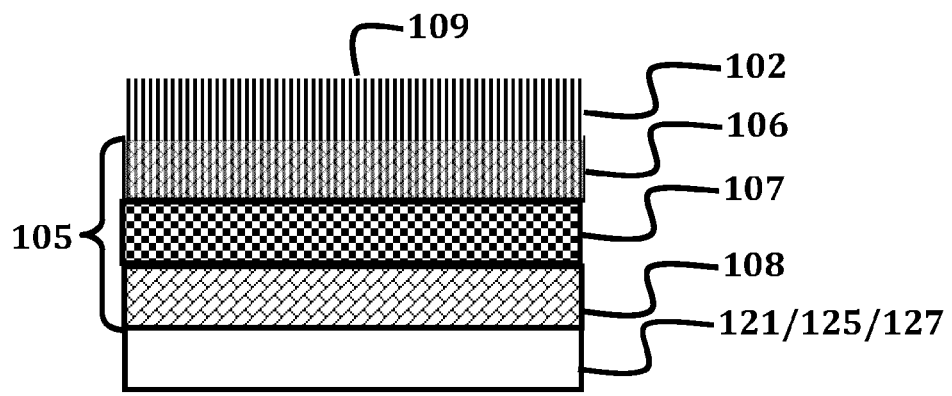
FIG. 10 is a cross-sectional view of a product made according to the process configuration of FIG. 7.

In one alternative embodiment, the self-supporting adhesive layer 105 and the second carrier film 121 are cut before flocking occurs. In other words, the cutting 156 and weeding 158 devices are positioned between the first 151 and second 152 rolls and the flocking device 154 so that cutting and weeding occurs before the flock is in (intimate) contact with the self-supporting adhesive layer 105. The flocked film 155 is next treated by the heating and/or pressurizing device 157 (such as a lamination machine) to produce the flocked product 109. The heating device heats the self-supporting adhesive layer 105 to a temperature above the softening point of the first adhesive film 106 as described herein according to various embodiments to adhere and/or embed the first fiber ends 103 in the first adhesive film 106. FIG. 10 depicts embodiments having the flock fibers 102 substantially embedded in the first adhesive film 106. The softening and pressuring operations also cause one of the second adhesive film 108 or the third adhesive film 129 to adhere to the carrier sheet 121.

Figure 11:
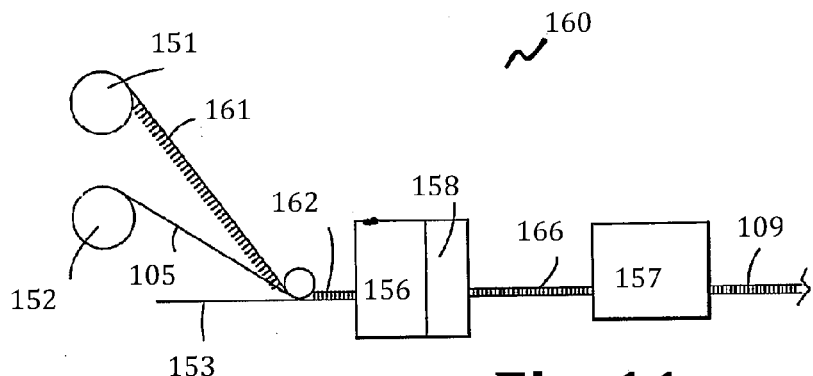
FIG. 11 shows another process configuration according to another embodiment.
Figure 12:
FIG. 12 is a plan view of a composite film made according to the process configuration of FIG. 11.
Figure 13:
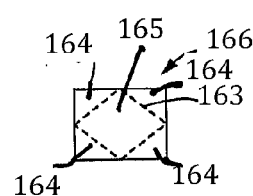
FIG. 13 is a plan view of a composite film made according to the process configuration of FIG. 11.
Figure 8:
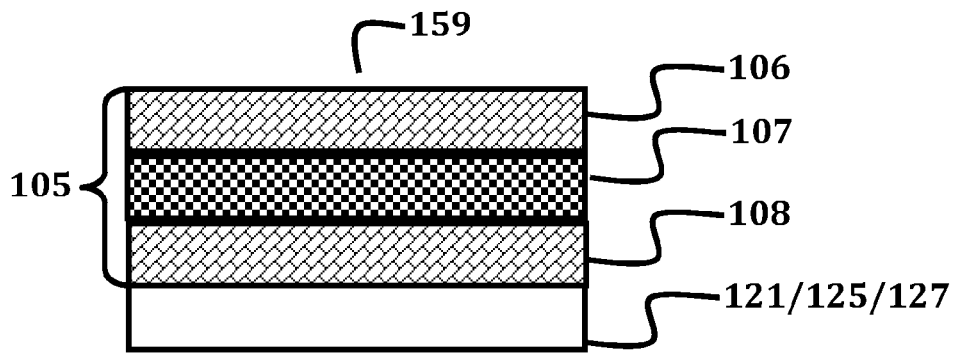
FIG. 8 is a cross-sectional view of contacted films made according to the process configuration of FIG. 7.
Figure 9:
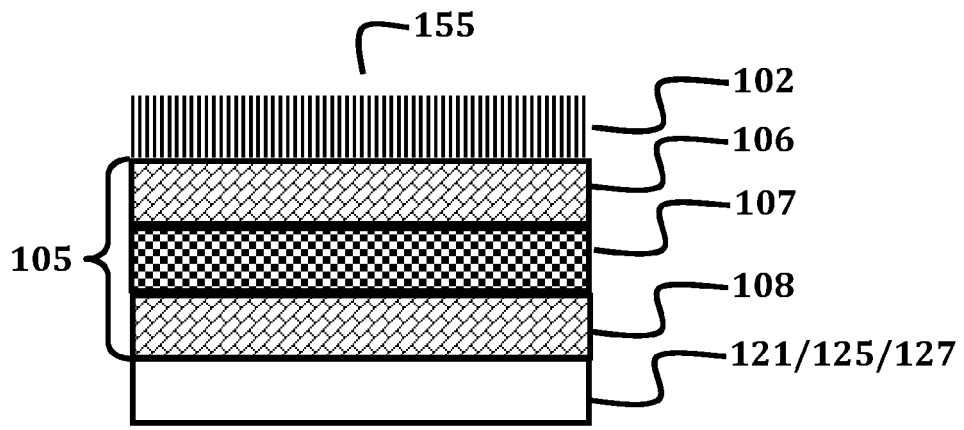
FIG. 9 is a cross-sectional view of a flocked film made according to the process configuration of FIG. 7.

FIGS. 11-13 depict another embodiment for manufacturing the flocked product 109 according to various embodiments. A second flocking system 160 for making the flocked product 109 will now be discussed with reference to FIGS. 11-13.

As in the first flocking system 150, the second flocking system 160 includes the first 151 and second 152 rolls. The first roll 151 contains a flocked transfer sheet 161 and the second roll 152 the self-supporting adhesive layer 105. The flocked transfer sheet 161 includes flock fibers 102 adhered to the first carrier sheet 100 by the release adhesive 101. The first flock fiber ends 103 comprise the free flock fiber ends of the flocked transfer sheet 161. As can be appreciated, the second flock fiber ends 104 are in contact with the release adhesive 101. The self-supporting adhesive layer 105 may or may not contain the second carrier sheet 121 and/or the opaque adhesive film 129.

The self-supporting adhesive layer 105 and flocked transfer 161 are contacted one on top of the other to form a flocked composite film 162. In the composite film 162, the self-supporting adhesive layer 105 is generally not adhered to and/or bonded to the first flock fiber ends 103.

The flocked composite film 162 is subjected to cutting in a suitable cutting device 156 to form a cut, composite flocked film 166. The flocked composite film 162 (including both the flocked transfer 161 and self-supporting adhesive layer 105) is cut into desired shapes 165, such as a diamond shape represented by cut lines 163 in FIG. 13. The cutting takes place while the flock is still mounted on the first carrier sheet 100. For laser cutting, the laser may be configured to cut to a precise depth or kiss cut so that it will not cut the web line 153.

The weeding device 158 next weeds the cut composite flocked film 166 to form cut and weeded flocked composite film 167. Unwanted portions 164 located exteriorly of the desired shapes 165 or cut lines 163, are removed prior the heating and/or pressurizing device 157. In other words, the desired shapes 165, but not the unwanted, exteriorly unwanted portions 164, remain on the web line 153 for input into the heating and/or pressurizing device 157.

The cut and weeded composite flocked film 167 is next heated and pressurized in the heating and/or pressurizing device 157 to form the flocked product 109 according to various embodiments.

Figure 14:
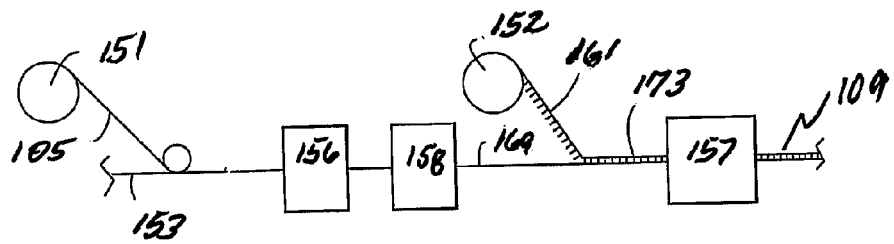
FIG. 14 shows yet another process configuration according to yet another embodiment.

FIG. 14 depicts a third system 168 to yet another embodiment for making flocked the product 109 according to various embodiments. The process includes a first roll 151 of the self-supporting adhesive layer 105, which is fed onto a continuous web line 153. The self-supporting adhesive layer 105 is cut into desired shapes by the cutting device 156 and the unwanted portions removed from the web line 153 by the weeding device 158 to form a cut and weeded self-supporting, elastomeric adhesive layer 169.

Figure 15:
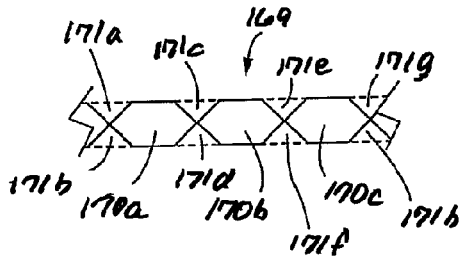
FIG. 15 is a plan view of a cut adhesive film made according to the process configuration of FIG. 14.

FIG. 15 depicts the cut and weeded self-supporting, elastomeric adhesive layer 169. The cut and weeded self-supporting, elastomeric adhesive layer 169 includes a plurality of identically shaped repeating adhesive layer segments 170a-170c and unwanted adhesive layer segments 171a-171h (the areas bounded by the dashed lines and peripheral lines of the adhesive layer segments) positioned between the adjacent segments have been removed by the weeding device 158.

Figure 16:
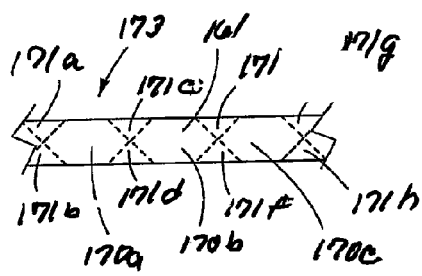
FIG. 16 is a plan view of a flock transfer positioned on top of the cut adhesive film of FIG. 15.

The cut and weeded self-supporting, elastomeric adhesive layer 169 is next contacted with the flocked transfer sheet 161 to form another flocked composite film 173. FIG. 16 shows the flocked transfer sheet 161 positioned on top of the adhesive layer segments 170a-170c (shown by dashed lines). As will be appreciated, the portions of the flocked transfer sheet 161 above weeded out segments 171a-171h having no adhesive to adhere to. Thus, after the heating and/or pressurizing device 157 removal of the first carrier sheet 100 removes the flock fibers 102 in these areas as well (because the flock fibers 102 stay attached to the carrier sheet).

As can be seen in FIG. 16, the various adhesive layer segments 170a-170c are interconnected by a thin part of continuous material peripherally running down the center of the material and the cut scrap material or weeded out segments 171a-171h may be interconnected by a thin part of continuous scrap material along at least one side of the portion of the cut material web to be discarded. In this way, a rewind mechanism can be used in the line (also called take-up reel) and when production begins the finished product and/or scrap material may be attached to the rewind wheel. The wheel or roll collects the material. In the case of weeding unwanted scrap material, the wheel or roll automatically removes the scrap material from the web before the scrap material is contacted with the flock fibers.

Figure 17:
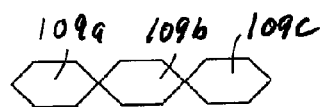
FIG. 17 is a plan view of a laminated film product made according to the process configuration of FIG. 14.
Figure 18:
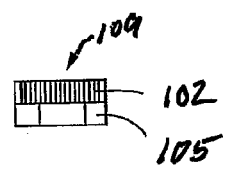
FIG. 18 is a cross-sectional view of a laminated film product made according to the process configuration of FIG. 14.

A laminator 171 causes the cut and weeded self-supporting, elastomeric adhesive layer 169 to adhere to the overlying flock fibers 102 in the transfer sheet 161 to form after the applying of heat and/or pressure the flocked product 109. Removal of the carrier sheet produces a plurality of flocked articles 109a-109c as shown in FIGS. 17 and 18. Each flocked product 109 includes a plurality of flock fibers 102 adhered to an underlying self-supporting adhesive layer 105. In some embodiments, the rigid layer 127 is attached the self-supporting adhesive layer 105, the rigid, inelastic film 128 of the rigid layer 127 is adhered to the second adhesive film 108 of the self-supporting adhesive layer 105.

The process of this embodiment is commonly preferred. The film combination may be quickly, precisely, and cleanly cut and weeded before being combined to flock-with-release-adhesive on another carrier substrate. During heat lamination and activation of adhesive films and/or layers, for example, flock will only transfer where it is in contact with the precut adhesive film and/or layer, and the peripheral flock fibers can do a nicer job of covering the edges than is possible with application of flock fibers before cutting of the adhesive film and/or layer is performed. In the latter case, "raw" cut edges can be seen and sometimes have a white adhesive appearance visible from the side that looks unfinished and therefore of lower perceived value to consumers.

In the embodiment of FIGS. 11 and 14, the release adhesive 101 may be selectively applied to the first carrier sheet 100 only in locations where flock fibers 102 are needed (such as in the areas of the transfer sheet 161 in contact with the adhesive layer segments 170a-170c), leaving the rest of the first carrier sheet 100 blank or free of release adhesive (such as in the areas of the transfer sheet 161 adjacent to the weeded out segments 171a-171h). In this manner, the flock fibers 102 will be applied only to the sections of the first carrier sheet 100 contacting the release adhesive 101 with no flock fibers 102 being located in the sections of the first carrier sheet 100 which are free of the release adhesive 101. The flock is thus applied only where needed, thereby saving material. As will be appreciated, the release adhesive 101 is generally applied to those sections of the first carrier sheet 100 overlying the adhesive layer segments 170a-170c. In one configuration, the release adhesive 101 is applied not only over the area of the first carrier sheet 100 in contact with the adhesive layer segments 170a-170c but also outside this area to avoid quality problems resulting from improper registration of the flocked area of the first carrier sheet 100 and the adhesive layer segments 170a-170c.

In another embodiment, the performing of cutting before laminating is done in a process in which (a) a hotmelt film is contacted with a carrier, (b) the film is coated with adhesive and flock to form a flocked article, and finally (c) the flocked article cold laminated to a pressure sensitive adhesive to form a "sticker" on a carrier. Cutting is performed after step (a) and before steps (b) and (c).

A number of variations and modifications of the disclosure can be used. It would be possible to provide for some features of the disclosure without providing others.

For example in one alternative embodiment, the process of the second embodiment is not limited to transfers. As will be appreciated, instead of a transfer sheet 161 the process may be used with direct flocking. In that event and with reference to FIG. 11, the laser cutting device 156 is positioned between the flocking device 154 and the heating/pressurizing device 157. In another alternative embodiment, the positions of the first 151 and second 152 rolls are reversed such that the first carrier sheet 100 is positioned on the bottom (in contact with the web line 153) and the self-supporting, elastomeric adhesive 154 on top. In other words, the flocked composite film 162 is flipped upside with the first carrier sheet 100 on the top. Having the first carrier sheet 100 on top can provide for cleaner cuts and prevent cutting of the web line 153 by the cutting device 156.

In another configuration, the flocked transfer sheet 161 may be precut and weeded using different cutting and weeding devices and located on top of the corresponding cut and weeded self-supporting, elastomeric adhesive layer 169 before lamination occurs. As will be appreciated, when a multicolor flocked design on the transfer sheet 161 is being laminated to a pre-cut film and/or it may be contacted in register. In other words, the cut film and/or is aligned using known techniques with the corresponding flocked design.

Figure 19:
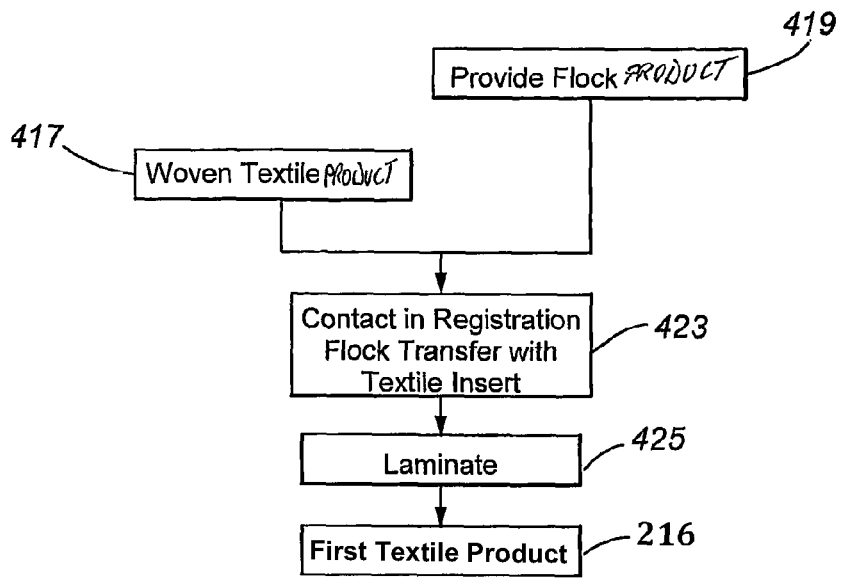
FIG. 19 depicts a process for making a textile article.
Figure 20:
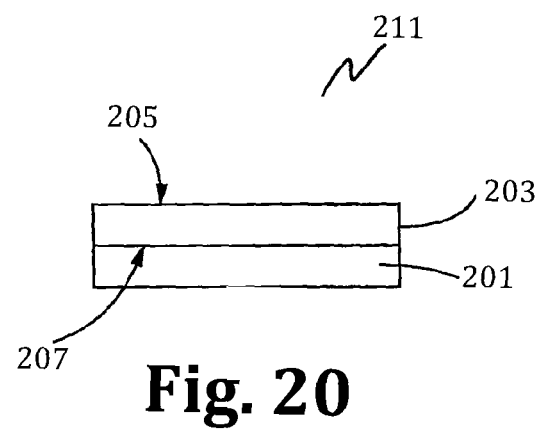
FIG. 20 is a cross-sectional view of view of a textile product according to the process depicted in FIG. 19.
Figure 21:
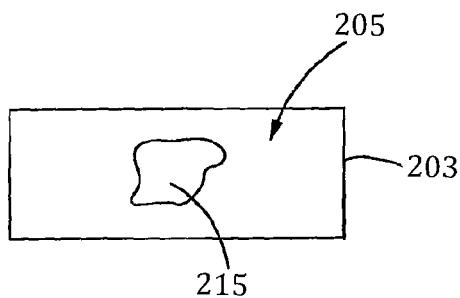
FIG. 21 is a plane view of a textile product according to the process depicted in FIG. 19.
Figure 22A:
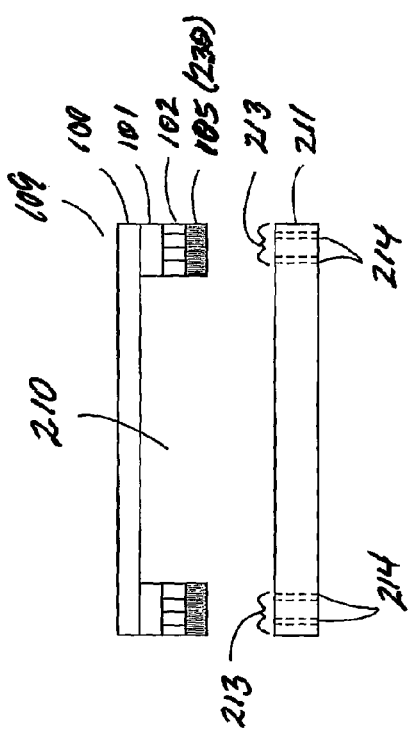
FIGS. 22A-22C are cross-sectional view of textile articles made according to depict textile designs according to the process depicted in FIG. 19.
Figure 22C:
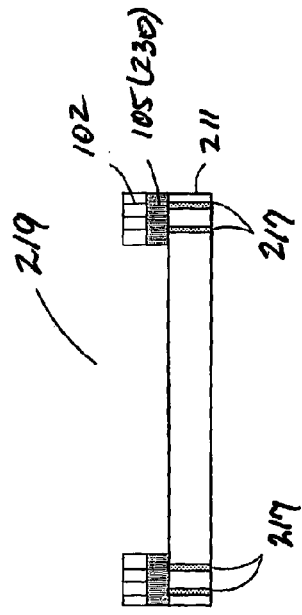
Figure 22B:
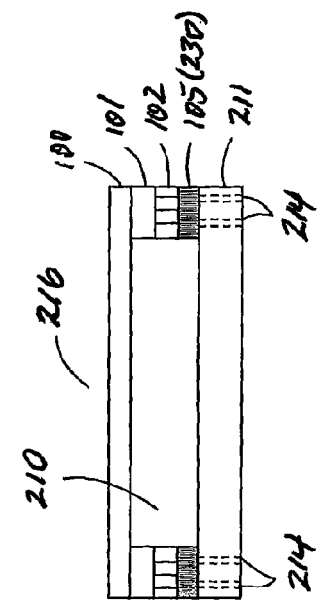

FIG. 19 depicts a process according to an embodiment for adhering a flocked product 109 according to various embodiments to a textile product 211 (FIGS. 20 and 21) to form the flocked articles as depicted in FIGS. 22A-22C.

In step 417, textile product 221 is provided. The textile product 211 comprises one of a woven or knitted fabric 230 containing a graphic design image 215 in the first textile surface 205, the woven or knitted fabric has an adhesive backing 201 positioned on the second textile surface 207. The first 205 and second 207 textile surfaces are in an opposing relationship. Preferably, the adhesive backing is an elastomeric adhesive, such as, an elastomeric self-supporting adhesive layer 105.

In step 419, a flocked transfer 109 according to various embodiments is provided, the flocked transfer has a void 210. The flocked transfer 109 comprises a plurality of flock fibers 102 adhered to a first carrier sheet 100 by a release adhesive 101. The plurality of flock fibers 102 are positioned between the release adhesive 101 and a self-supporting adhesive layer 105, the flock fibers are adhered to a first adhesive film 106 of the self-supporting adhesive layer 105, the self-supporting adhesive layer 105 comprises an obstructive film 107 positioned between the first adhesive film 106 and a second adhesive film 108. Optionally, the flocked transfer 109 can further comprise a rigid layer 127 adhered to the self-supporting adhesive layer 105. The rigid layer 127 comprises a rigid, inelastic film 128 and a third adhesive 129. The rigid, inelastic film 128 is adhered to the second adhesive film 108.

In step 423, the flocked product 109 and the woven textile product 211 are contacted in registration. That is, one of the second 108 or third 129 adhesive films is contacted with registration area 213 of the woven textile product 211 (FIG. 22A). Additionally, the void 210 is in registration with at least most, if not all, of the design image 215 of the woven textile product 211.

It is appreciated that the void 210, the woven textile product 211 is configured and/or sized, such that the woven textile product 211 and void 210 substantially match to properly display the woven textile product 211, when placed adjacent to the void 210. It can be further appreciated that, in one configuration, the void 210 and/or the design image 215 substantially match in size and shape to properly display the woven textile product 211 and/or design image 215 when placed adjacent to the void 210. In another configuration, the design image 215 or textile product 211 is slightly larger than the void 210. In this configuration, the width and height dimensions of the design image 215 are preferably at least about 2 mm, and even more preferably at least about 4 mm larger than the same respective dimensions of the void 210.

Preferably, the registration area 213 has been prepared to accept one of the second 108 or third 129 adhesives. Prepared to accept one of the adhesives means at least some, if not most, of the registration area 213 has be treated to substantially promote and/or enhance adhesive bonding of the woven textile product 211 with one of second 108 or third 129 adhesives being contacted with the woven textile product 211. In one configuration, the woven textile product 211 may be ablated, mechanically, chemically, or thermally treated to improve adhesive bonding. While not wanting to be limited by example, the registration area 213 has been prepared by forming a plurality of holes 214 within the registration area 213.

In step 425, one of the second 108 or third 129 adhesives is thermally bonded to the woven textile product 211 to form a first textile product 216 (FIG. 22B). During step 425, one of the second 108 or third 129 adhesives is softened and/or partly liquefied and under the application of heat and pressure and flows into the plurality of holes 214 filling the plurality of holes with the respective adhesive (shown in FIG. 22B as 217). It can be appreciated that the woven textile 203 may be removed in selected areas of the contact area 629. While not wanting to be bound by any theory, it is believed that the respective adhesive 108 or 129 within the plurality of holes 214 substantially adhesively bonds with the woven textile product 211 by one or more of: mechanical, electrostatic, adsorption, chemisorption, diffusion, or a combination thereof. Preferably, the adhesive interaction of the respective adhesive 108 or 129 with the woven textile product 211 is at least some, if not mostly, mechanical in nature.

The carrier sheet 100 with release adhesive 101 may be removed from the first textile product 216 to form a second textile product 219. In one configuration, one of the second 108 or third 129 adhesive films holding the transfer to the adjacent face of the insert 417 (FIGS. 22A-22C) provides a substantially satisfactory bond (at least about 10 pounds measured by a lab peel test), primarily by securing a mechanical grip on the insert's surface.

Other embodiments of this process are discussed in U.S. Pat. Nos. 5,207,851; 5,346,746; and 6,110,560; and U.S. patent application Ser. Nos. 11/460,519 and 12/397,946, each of which is incorporated herein by this reference.

Figure 23:
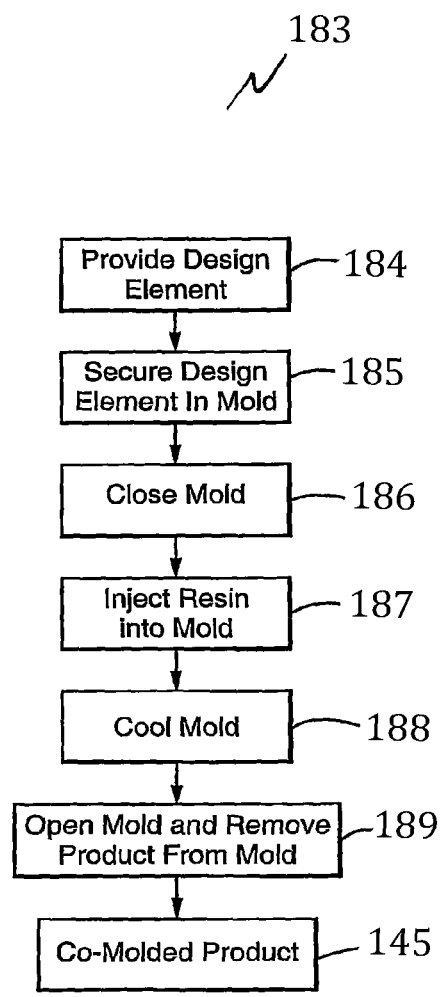
FIG. 23 depicts a molding process for making a molded product according to an embodiment.

Another aspect is depicted in FIGS. 23, 24, 25, and 26. FIG. 23 depicts a process 183 for a co-molded product 145 having flocked product. Aspects of the molding process are discussed in U.S. Pat. Nos. 7,338,697, 7,351,368, and 7,393,576 and copending U.S. application Ser. No. 12/013,996, filed Jan. 14, 2008, each of which is incorporated herein by this reference.

Figure 24:
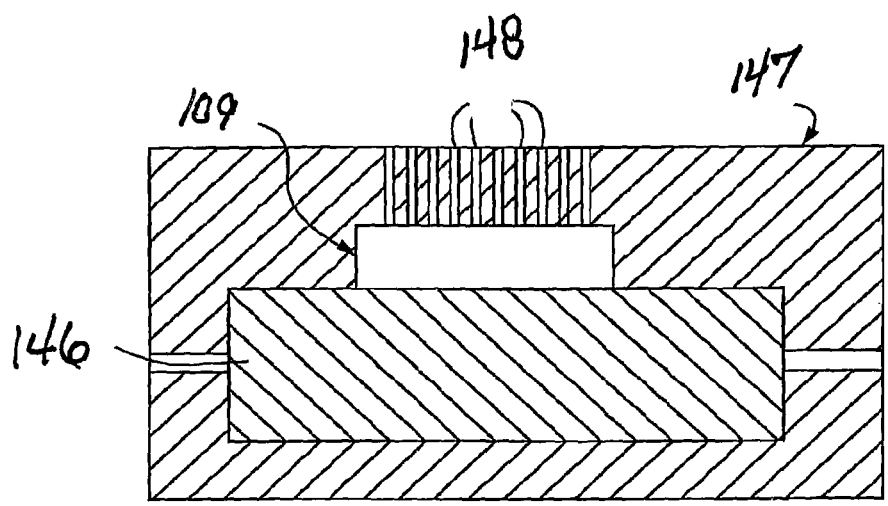
FIG. 24 is a cross-sectional view of a mold and molded product according to the process depicted in FIG. 23.

In step 185, the flocked product 109 according to various embodiment of present invent is provided and mounted in a mold 147. The flocked product 109 can be provided with or without the release adhesive 101 and carrier sheet 100. FIG. 24 depicts a configuration where the flocked product 109 is on top of molded article 146. In another configuration, depicted in FIG. 25, the flocked product 109 is embedded in the molded article 146. The flocked product 109 may be cut and/or fabricated to fit within the mold 147. In one configuration, the flocked product 109 has an optional backing material 149.

The flocked product 109 is secured in step 185 within the mold 147 by any means, such as, but not limited to, a temporary or release adhesive, or by the use of a vacuum. The mold 147 is depicted with vacuum holes 148 passing through the mold body, the vacuum holes 148 are in contact with the flocked product 109. A vacuum may be drawn through the vacuum holes 148 to hold the flocked product 109 in place within the mold 147.

In another configuration, a low-pressure resin injection may be used secure the flocked product 109 in position; after securing the flocked product 109, a second full-pressure injection is made.

Figure 25:
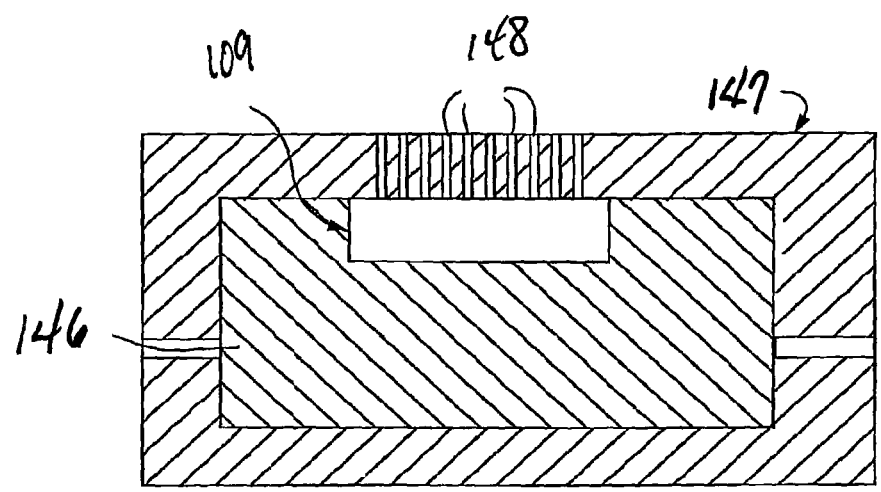
FIG. 25 is a cross-sectional view of another mold and molded product according to the process depicted in FIG. 23.

In another configuration, a the mold 147 cavity may have a slight depression (of about 1 mm) to accommodate the flocked product 109, such that, the flocked product 109 is substantially flush with a surface of the molded article 146, as shown in FIG. 25.

After securing the flocked product 109 in the mold 147, the mold 147 is closed in step 186 and a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable molded article. That is, the molded article 146 substantially has elastic properties (as defined above).

In step 188, the mold 147 is cooled, after injecting the resin into the mold 147. The mold 147 may be cooled by any appropriate method known within the art. One preferred method for cooling is circulating water, either around the exterior or through the walls of the mold 147. The water may be circulated during or after the injection molding process.

As the resin cools, the resin permanently bonds with the flocked product 109 to form the co-molded product 145. When the resin has sufficiently cooled and/or solidified the mold 147 is opened and the co-molded product 145 is removed, in step 189, from the mold 147. In instances where the flocked product 109 the first carrier sheet 100 and associated release adhesive 101 are removed from the co-molded product 145.

Figure 26:
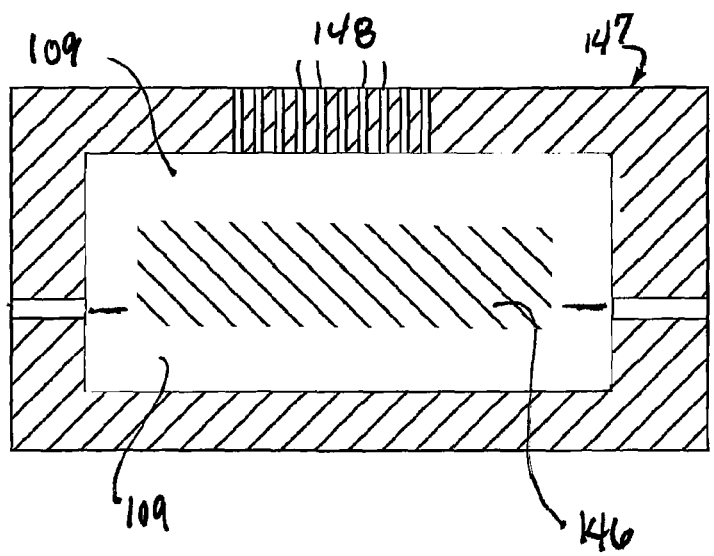
FIG. 26 is a cross-sectional view of yet another mold and molded product according to the process depicted in FIG. 23.

FIG. 26 depicts another mold 147 which may be used in the process depicted in 24 for forming a co-molded product 145. The flocked product 109 is secured in step 185 around one of the entire perimeter and/or volume of the mold 147 by any means, such as, but not limited to, a temporary or release adhesive, or by the use of a vacuum. The mold 147 is depicted with vacuum holes 148 passing through the mold body, the vacuum holes 148 are in contact with the flocked product 109. A vacuum may be drawn through the vacuum holes 148 to hold the flocked product 109 in place within the mold 147. It can be appreciated that the mold need not have the vacuum holes 148, since the flocked product 109 can be secured in mold by other methods, such as a release adhesive.

In one configuration, after securing the flocked product 109 in the mold 147, a substantially pre-formed elastomeric article may be placed in the mold 147 and contacted with at least some of the flocked product 109 secured in the mold. The mold 147 is closed in step 186 and one or both of heat and pressure are applied to adhesively bond the flocked product 109 to the pre-formed elastomeric article. The mold is cooled, in step 188, if needed and the co-molded product 145 is removed from the mold 147 in step 189.

In another configuration, after securing the flocked product 109 in the mold a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable molded article. That is, the molded article 146 substantially has elastic properties (as defined above). For example, the resin portion of the molded article 146 can be an elastic material. In step 188, the mold is cooled and the co-molded product 145 is removed, in step 189, from the mold 147.

In another embodiment, a flocked product 109 is provided in the form of a stretchable film, preferably having adhesive properties. In a preferred embodiment, the stretchable film comprises three layers. In a more preferred embodiment, at least one of the three layers is an adhesive layer. The adhesive layer is preferably a thick layer. The thick adhesive layer can substantially sink in substrates having a high-pile. Furthermore, the thick substrate can provide a substantially stable foundation and/or base. For example, when the stretch film is adhesively bound to a flock layer, the stretch film can provide a substantially stable foundation when the flock layer is adhesively bonded to a high pile substrate, such as a sweat band or terry-cloth substrate.

In another embodiment, the stretch film has a high resistance to splitting when the film is substantially stretched. The stretch film has substantial elastomeric properties when elongated about 100%, preferably when elongated about 200%, more preferably when elongated about 400%.

In some embodiments, a common carrier film and release adhesive are used to hold together multiple design media that collectively form an image to be applied to a substrate. In other words, the multiple design media are in register relative to a selected point or area of the image. The various design media, which may be flocked and/or unflocked design media, may or may not be otherwise interconnected, such as by a common adhesive film. In one application, the various design media are interconnected by techniques described in one or more of U.S. Pat. Nos. 5,047,103, 5,207,851, 5,346,746, 6,110,560, copending U.S. application Ser. No. 11/460,493, filed Jul. 27, 2006, Ser. No. 11/460,519, filed Jul. 27, 2006, Ser. No. 12/397,946, filed Mar. 4, 2009, and Ser. No. 12/758,633, filed Apr. 12, 2010, each of which is incorporated herein by this reference.

In other embodiments, different types of design media are combined to create new visual effects. For example, design media as described herein and in copending U.S. application Ser. No. 12/031,445, filed Feb. 14, 2008, (which is incorporated herein by this reference), can be combined to create surprisingly real (to both appearance and touch) new dimensional images that look and feel like high value textures of a much more expensive textile. This illusion is created by the interplay of the real texture of unique textiles plus an "overlay" of intricate sub due transfer images printed in register to the underlying textile texture. This can create a much more dimensional texture to the design.

In some embodiments, one or more of the above embodiments may be combined with features disclosed in one or more of the following: U.S. Pat. Nos. 7,364,782; 7,410,682; 7,344,769; 7,413,581; U.S. patent application Ser. No. 12/706,622 with a filing date of Feb. 16, 2010; U.S. patent application Ser. No. 12/580,120 with a filing date of Oct. 15, 2009; U.S. patent application Ser. No. 11/533,699 with a filing date of Sep. 20, 2006; U.S. patent application Ser. No. 11/560,679 with a filing date of Nov. 16, 2006; U.S. patent application Ser. No. 11/849,840 with a filing date of Nov. 4, 2007, each of which is incorporated in its entirety herein by this reference.

The present disclosure, in various embodiments, configurations, or aspects, includes components, methods, processes, systems and/or apparatus substantially as depicted and described herein, including various aspects embodiments, configurations, sub-combinations, and subsets thereof. Those of skill in the art will understand how to make and use the various aspects, embodiments, configurations, sub-combinations, and subsets of the present disclosure after understanding the disclosure. The present disclosure, in various aspects, embodiments, and configurations, includes providing devices and processes in the absence of items not depicted and/or described herein or in various aspects, embodiments, or configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more aspects, embodiments, or configurations for the purpose of streamlining the disclosure. The features of the aspects, embodiments, or configurations of the disclosure may be combined in alternate aspects, embodiments, or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, or configuration. Thus, the following claims are hereby incorporated into this Detailed Description, with each claim standing on its own as a separate preferred embodiment.

Moreover, though the description of the disclosure has included description of one or more aspects, embodiments, or configurations and certain variations and modifications, other variations, combinations, and modifications are within the scope of the invention, e.g., as may be within the skill and knowledge of those in the art, after understanding the present disclosure. It is intended to obtain rights which include alternative aspects, embodiments, or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An article, comprising:
    a plurality of flock fibers having opposing first and second ends;
    an elastomeric layer positioned between first and second adhesive films, wherein the plurality of flock fibers are adhered to the first adhesive film; and
    an inelastic layer adhered to an elastomeric textile substrate by a third adhesive film, wherein the inelastic layer is positioned between the second and third adhesive films.

2. The article of claim 1, wherein the first adhesive film has a thickness of no more than about 125 μm.

3. The article of claim 1, wherein the first and second adhesive films comprise polyurethane.

4. The article of claim 1, wherein at least some of the flock fibers are in contact with the elastomeric layer and wherein the flock fibers do not penetrate the elastomeric layer.

5. The article of claim 1, wherein the first ends are embedded in the first adhesive film to a depth of at least about 50% of the first adhesive film thickness.

6. The article of claim 1, wherein the elastomeric textile substrate is an item of apparel.

7. The article of claim 1, wherein the elastomeric textile substrate is a non-apparel item.

8. The article of claim 1, wherein the plurality of flock fibers are adhered to the elastomeric textile substrate by the third adhesive film.

9. The article of claim 1, wherein the inelastic layer comprises a polymeric material.

10. An article, comprising:
    flock fibers adhered to an elastic layer by a first adhesive film, wherein the first adhesive film is positioned between the flock fibers and the elastic layer;
    an inelastic layer adhered to the elastic layer by a second adhesive film, wherein the inelastic layer is positioned between the second adhesive film and a third adhesive film; and
    a stretchable substrate adhered to the inelastic layer by the third adhesive.

11. The article of claim 10, wherein the flock fibers have a flock fiber length, and wherein no more than about 2% of the flock fiber length penetrates the first adhesive film.

12. The article of claim 10, wherein the third adhesive film is positioned between and in contact with the substrate and the inelastic film.

13. The article of claim 10, wherein the flock fibers are adhered to the surface of the first adhesive film.

14. The article of claim 10, wherein the first and second adhesive films comprise polyurethane.

15. The article of claim 10, wherein the inelastic layer comprises a polymeric material.

16. The article of claim 10, wherein the stretchable substrate comprises an item of apparel.

17. The article of claim 10, wherein the first adhesive film has a thickness of no more than about 125 μm.

18. An article, comprising:
    flock fibers adhered to an elastic layer by a first adhesive film;
    an inelastic layer adhered to the elastic layer by a second adhesive film, the second adhesive film being positioned between the elastic and inelastic layers; and
    a stretchable substrate adhered to the inelastic layer a third adhesive film, the third adhesive film being positioned between the inelastic layer and the substrate.

19. The article of claim 18, wherein the flock fibers have a flock fiber length and wherein no more than about 1% of the flock fiber length penetrates the first adhesive film.

20. The article of claim 18, wherein the stretchable substrate comprises a stretchable and/or elastomeric item of apparel.

21. The article of claim 18, wherein the flock fibers are adhered to the surface of the first adhesive film.

22. The article of claim 18, wherein the flock fibers do not penetrate the elastic layer.

23. The article of claim 18, wherein the flock fibers are embedded in the first adhesive film to a depth of at least about 50% of the first adhesive film thickness.

* * * * *